(12) United States Patent
Ito et al.

(10) Patent No.: US 11,768,651 B2
(45) Date of Patent: Sep. 26, 2023

(54) INFORMATION PROCESSING DEVICE AND CONTROL METHOD

(71) Applicant: Lenovo (Singapore) Pte. Ltd., Singapore (SG)

(72) Inventors: Yoshinori Ito, Kanagawa (JP); Noritoshi Yoshiyama, Kanagawa (JP)

(73) Assignee: Lenovo (Singapore) Pte. Ltd., Republic of (SG)

( * ) Notice: Subject to any disclaimer, the term of this patent is extended or adjusted under 35 U.S.C. 154(b) by 0 days.

(21) Appl. No.: 17/879,372

(22) Filed: Aug. 2, 2022

(65) Prior Publication Data

US 2023/0076721 A1 Mar. 9, 2023

(30) Foreign Application Priority Data

Sep. 9, 2021 (JP) ................................ 2021-146750

(51) Int. Cl.
*G06F 3/14* (2006.01)
*G06F 1/16* (2006.01)

(52) U.S. Cl.
CPC .......... *G06F 3/1431* (2013.01); *G06F 1/1616* (2013.01)

(58) Field of Classification Search
CPC ............................. G06F 3/1431; G06F 1/1616
See application file for complete search history.

(56) References Cited

U.S. PATENT DOCUMENTS

| 8,266,550 B1* | 9/2012 | Cleron | H04M 1/72469 |
| | | | 345/173 |
| 10,133,310 B2* | 11/2018 | Kim | G06F 3/147 |
| 2013/0086508 A1* | 4/2013 | Oguz | G06F 3/04883 |
| | | | 715/779 |
| 2016/0034597 A1 | 2/2016 | Graf et al. | |
| 2016/0132074 A1* | 5/2016 | Kim | G06F 1/1652 |
| | | | 345/173 |
| 2017/0344120 A1* | 11/2017 | Zuniga | G06F 3/0484 |
| 2020/0126519 A1* | 4/2020 | Heo | G06F 3/04842 |
| 2020/0175945 A1* | 6/2020 | Chen | G06F 3/017 |
| 2020/0264826 A1* | 8/2020 | Kwon | G06F 1/1677 |

(Continued)

FOREIGN PATENT DOCUMENTS

| JP | H05-066912 A | 3/1993 |
| JP | H06-149521 A | 5/1994 |

(Continued)

*Primary Examiner* — Dmitriy Bolotin
(74) *Attorney, Agent, or Firm* — Osha Bergman Watanabe & Burton LLP

(57) ABSTRACT

An information processing device includes: a foldable one display; a memory which stores at least a program; and a processor which executes the program stored in the memory. By executing the program stored in the memory, the processor performs: display mode switching processing to switch between a first display mode in which display of a screen area of the display is controlled as one display area, and a second display mode in which the screen area of the display is split into two display areas of a first display area and a second display area to control the display; information holding processing to hold window information about position and size, in the screen area, of a window of each application running in the first display mode; and display control processing to display the window of the running application in the screen area.

10 Claims, 16 Drawing Sheets

(56) References Cited

U.S. PATENT DOCUMENTS

| | | | | |
|---|---|---|---|---|
| 2020/0326900 A1* | 10/2020 | Kwon | ............... | G06F 3/1446 |
| 2020/0379516 A1* | 12/2020 | Park | ............... | G06F 1/1652 |
| 2021/0074242 A1* | 3/2021 | Cho | ............... | G06F 9/448 |
| 2021/0150953 A1* | 5/2021 | Lee | ............... | G09G 3/035 |
| 2021/0216332 A1* | 7/2021 | Li | ............... | G06F 1/1641 |
| 2023/0014641 A1* | 1/2023 | Chung | ............... | G06F 1/1624 |
| 2023/0076721 A1* | 3/2023 | Ito | ............... | G06F 3/1431 |

FOREIGN PATENT DOCUMENTS

| | | | |
|---|---|---|---|
| JP | 2012-502321 | A | 1/2012 |
| JP | 2012-508405 | A | 4/2012 |
| JP | 2013-545168 | A | 12/2013 |
| JP | 2015-132965 | A | 7/2015 |
| JP | 2015-233198 | A | 12/2015 |
| JP | 2018-013850 | A | 1/2018 |
| JP | 2019-067308 | A | 4/2019 |
| JP | 2020-518054 | A | 6/2020 |
| JP | 2020-190940 | A | 11/2020 |

* cited by examiner

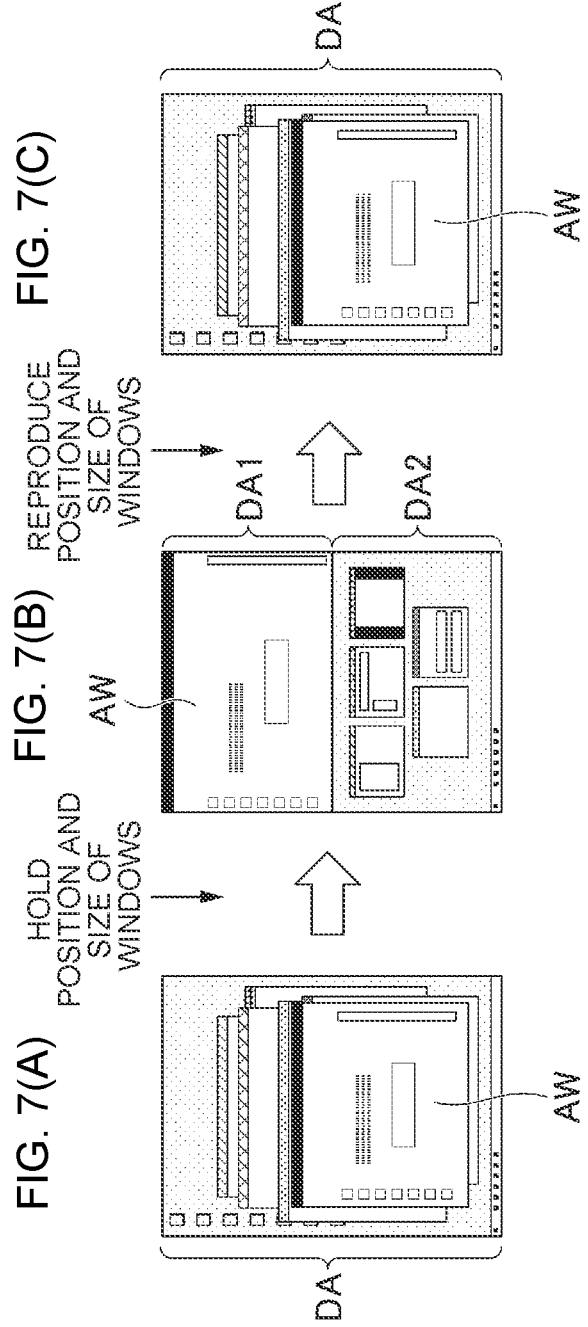

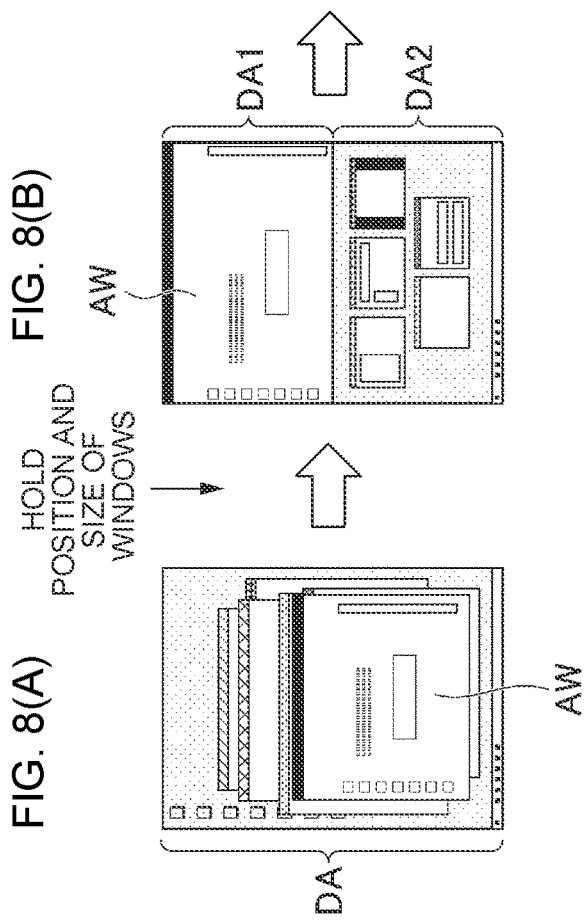
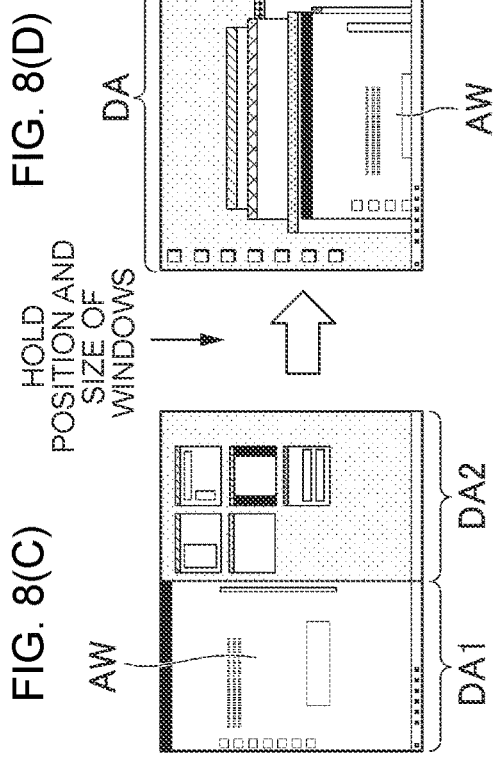
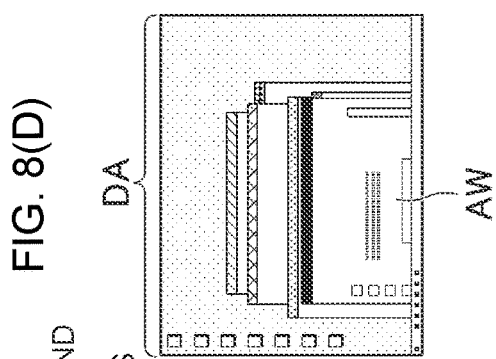

| APP ID | WINDOW POSITION (x, y) | WINDOW SIZE (VERTICAL/HORIZONTAL) |
|---|---|---|
| APP 1 | (x1, y1) | (a1, b1) |
| APP 2 | (0, 0) | MAXIMIZED |
| APP 3 | (x3, y3) | (a3, b3) |
| ⋮ | ⋮ | ⋮ |

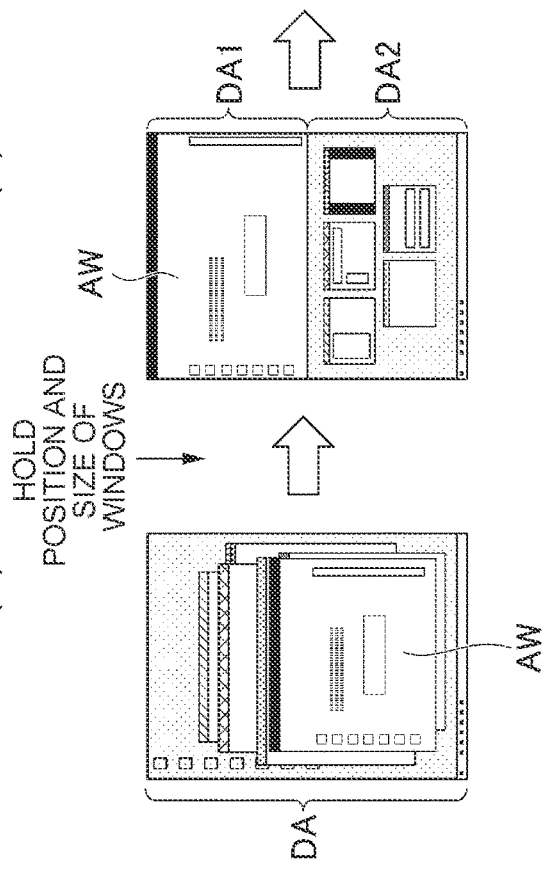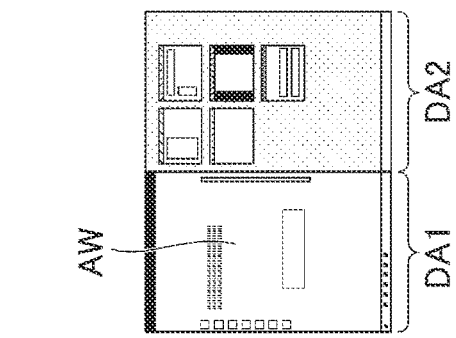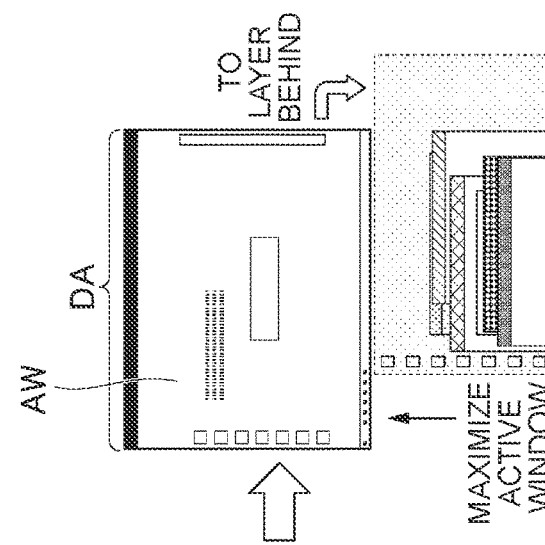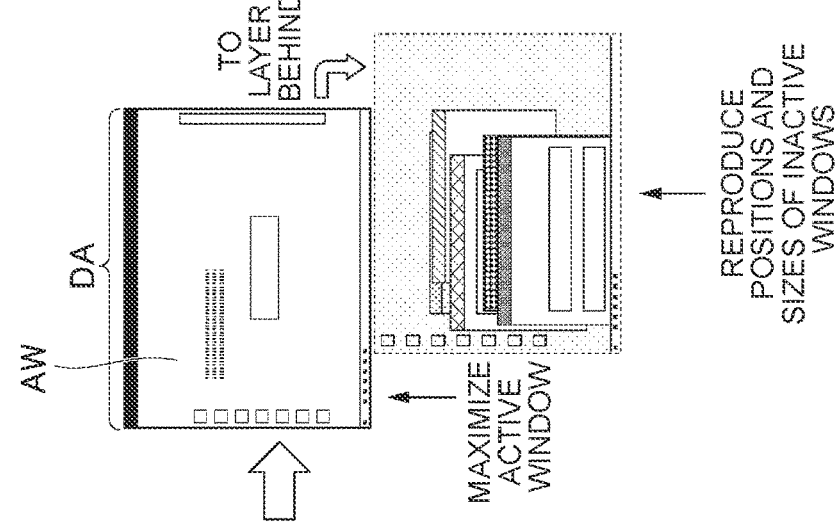

INFORMATION PROCESSING DEVICE AND CONTROL METHOD

CROSS-REFERENCE TO RELATED APPLICATIONS

This application claims priority to Japanese Patent Application No. 2021-146750 filed on Sep. 9, 2021, the contents of which are hereby incorporated herein by reference in their entirety.

TECHNICAL FIELD

The present invention relates to an information processing device and a control method.

BACKGROUND

There is an information processing device having plural screens (for example, two screens). For example, an information processing device having a two-screen structure in which displays (display units) are mounted respectively on a first chassis and a second chassis rotatable relative to each other through a coupling unit (hinge mechanism) is disclosed (for example, Japanese Unexamined Patent Application Publication No. 2015-233198). When two displays are provided in this way, the two displays can not only be used as a two-screen mode, but also the display areas of the two displays may be united into one display area to be able to be used as a one-screen mode.

Further, in recent years, an information processing device in which a foldable flexible display (display unit) is provided over a first chassis and a second chassis in a manner to be bendable according to the rotation between the first chassis and the second chassis has been disclosed (for example, see Japanese Unexamined Patent Application Publication No. 2018-13850). When one display is provided over the first chassis and the second chassis in this way, the one display can not only be used as a one-screen mode but also as a pseudo two-screen mode in which the one display is split into a display area on the first chassis side and a display area on the second chassis side.

When applications run on an information processing device to do work, there are cases where a user wants to display the window of an application on one screen and display two or more applications on two screens. In the information processing device usable in both the one-screen mode and the two-screen mode as described above, since the information processing device can be used by switching between the one-screen mode and the two-screen mode depending on the work content, it is convenient. However, since the display state of windows is also changed between the one-screen mode and the two-screen mode depending on the work, the display state may not be an appropriate display state after switching.

SUMMARY

One or more embodiments of the present invention provide an information processing device and a control method to control display properly upon switching between a one-screen mode and a two-screen mode.

One or more embodiments of the present invention is an information processing device that includes: a foldable one display; a memory which stores at least a program; and a processor which executes the program stored in the memory, wherein, by executing the program stored in the memory, the processor performs: display mode switching processing to switch between a first display mode in which the display of a screen area of the display is controlled as one display area, and a second display mode in which the screen area of the display is split into two display areas of a first display area and a second display area to control the display; information holding processing to hold window information about the position and size, in the screen area, of the window of each application running in the first display mode; and display control processing to display the window of the running application in the screen area with the position and size based on the window information held by the information holding processing when switching from the second display mode to the first display mode is done again after switching from the first display mode to the second display mode by the display mode switching processing.

The above information processing device may also be such that, when switching from the first display mode to the second display mode is done by the display mode switching processing, the processor displays, in the display control processing, an active window in the first display mode in the first display area, and displays, in the second display area, thumbnail images corresponding to inactive windows other than the active window in the first display mode.

The above information processing device may further include a sensor which detects the orientation of the information processing device, wherein by executing the program stored in the memory, the processor further performs orientation detection processing to detect the orientation of the screen area based on the detection result of the sensor, and even when switching from the second display mode to the first screen mode is done in such a state that the display orientation in the screen area is changed according to a change in the orientation of the screen area after switching from the first display mode to the second display mode by the display mode switching processing, the processor displays, in the display control processing, the window of each running application in the screen area with the position and size based on the window information held by the information holding processing.

The above information processing device may further be such that, by the display mode switching processing, the processor further performs display area switching processing to switch between a mode to control display by setting the first display area as a primary screen and the second display area as a secondary screen in the second display mode, and a mode to control display by setting the second display area as the primary screen and the first display area as the secondary screen in the second display mode, and even when switching from the second display mode to the first display mode is done in such a state that the display area switching processing is performed after switching from the first display mode to the second display mode by the display mode switching processing, the processor displays, in the display control processing, the window of each running application in the screen area with the position and size based on the window information held by the information holding processing.

Further, the above information processing device may be such that, in a case where the window information of an application the window of which is maximized in the first display mode is held, when switching from the second display mode to the first display mode is done by the display mode switching processing, the processor displays, in maximized form, the window of the application in the screen area by the display control processing.

Further, the above information processing device may be such that, when switching from the second display mode to the first display mode is done by the display mode switching processing, the processor displays, in maximized form, an active window among windows of running applications in the screen area by the display control processing, and when inactive windows other than the active window are displayed in the screen area, the processor displays the inactive windows with the positions and sizes based on the window information held by the information holding processing.

Further, the above information processing device may be such that, in response to switching from the first display mode to the second display mode by the display mode switching processing, the processor holds, in the information holding processing, the window information of applications running in the first display mode before switching.

Further, the above information processing device may be such that, in response to launching the program to perform at least the display mode switching processing, the processor holds, in the information holding processing, the window information of applications running upon launching the program, and when a new application is launched in the first display mode after launching the program, the processor adds and holds the window information of the launched application.

Further, the above information processing device may be such that, when the position or size of a window of an application in the screen area held as the window information is changed in the first display mode, the processor updates, in the information holding processing, the window information of the application based on the position or size after changed.

Further, the above information processing device may be such that, when a running application is closed in the first display mode, the processor erases the window information of the closed application in the information holding processing.

Further, a control method for an information processing device according to one or more embodiments of the present invention is a control method for an information processing device including: a foldable one display; a memory which stores at least a program; and a processor which executes the program stored in the memory, the control method including, by the processor executing the program stored in the memory: a step of switching between a first display mode in which the display of a screen area of the display is controlled as one display area, and a second display mode in which the screen area is split into two display areas of a first display area and a second display area to control the display; a step of holding, in the memory, window information about the position and size, in the screen area, of the window of each application running in the first display mode; and a step of displaying the window of the running application in the screen area with the position and size based on the window information when switching from the second display mode to the first display mode is done again after switching from the first display mode to the second display mode.

The above-described aspects of the present invention can control display on a foldable display properly upon switching between a one-screen mode and a two-screen mode.

BRIEF DESCRIPTION OF THE DRAWINGS

FIGS. 7(A)-(C) are diagrams illustrating a first example of display upon switching between a one-screen mode and the two-screen mode according to the first embodiment.

FIGS. 8(A)-(D) are diagrams illustrating a second example of display upon switching between the one-screen mode and the two-screen mode according to the first embodiment.

FIGS. 17(A)-(D) are diagrams illustrating a display example upon switching between the one-screen mode and the two-screen mode according to a second embodiment of one or more embodiments.

DETAILED DESCRIPTION

Embodiments of the present invention will be described below with reference to the accompanying drawings.

First Embodiment

First, an overview of a first embodiment of one or more embodiments of the present invention will be described.

Figure 1:
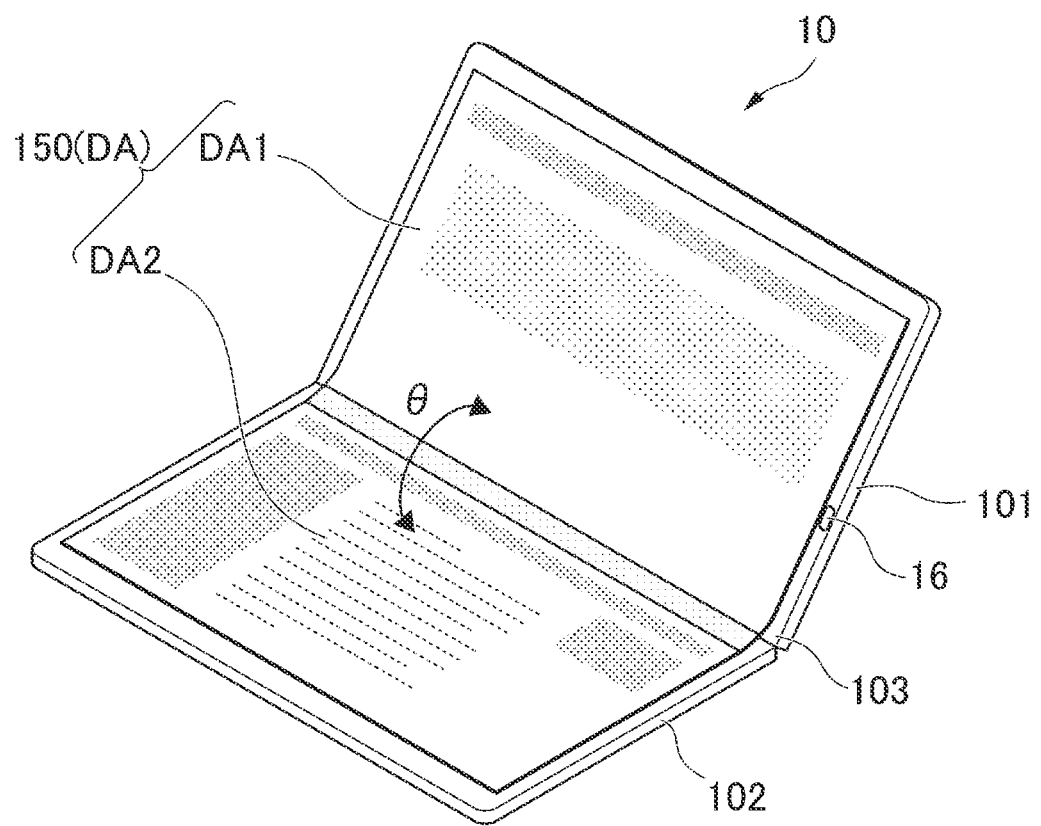
FIG. 1 is a perspective view illustrating the appearance of an information processing device according to a first embodiment of one or more embodiments.

FIG. 1 is a perspective view illustrating the appearance of an information processing device 10 according to the present embodiment. The information processing device 10 according to the present embodiment is a clamshell (laptop) PC (Personal Computer). The information processing device 10 includes a first chassis 101, a second chassis 102, and a hinge mechanism 103. The first chassis 101 and the second chassis 102 are chassis having a substantially rectangular plate shape (for example, a flat plate shape). One of the sides of the first chassis 101 and one of the sides of the second chassis 102 are joined (coupled) through the hinge mechanism 103 in such a manner that the first chassis 101 and the second chassis 102 are rotatable relative to each other around the axis of rotation of the hinge mechanism 103. A state where an open angle θ between the first chassis 101 and the second chassis 102 around the axis of rotation is substantially 0° is a state where the first chassis 101 and the second chassis 102 are closed in such a manner as to overlap each other. The state where the first chassis 101 and the second chassis 102 are closed is called a "closed state" (closed). Surfaces of the first chassis 101 and the second chassis 102 on the sides to face each other in the closed state are called "inner surfaces," and surfaces on the other sides of the inner surfaces are called "outer surfaces," respectively. The open angle θ can also be called an angle between the inner surface of the first chassis 101 and the inner surface of the second chassis 102. As opposed to the closed state, a state where the first chassis 101 and the second chassis 102 are open is called an "open state." The open state is a state where the first chassis 101 and the second chassis 102 are rotated relative to each other until the open angle θ exceeds a preset threshold value (for example, 10°).

Further, the information processing device 10 includes a camera 16 and a display 150. The camera 16 is provided on the inner surface of the first chassis 101. The display 150 is provided over the inner surface of the first chassis 101 and the inner surface of the second chassis 102. For example, the camera 16 is provided in an outer part of a screen area of the display 150 on the inner surface of the first chassis 101 to be able to capture a user or the like present on the side facing the display 150. The display 150 is a flexible display flexible according to the open angle θ by the relative rotation between the first chassis 101 and the second chassis 102 (see FIG. 2 and FIG. 3). As the flexible display, an organic EL display or the like is used. The information processing device 10 can control not only display as a one-screen structure in the entire screen area as one display area DA of the display 150, but also display as a two-screen structure by splitting the screen area of the display 150 into two display areas as a first display area DA1 and a second display area DA2. Here, the first display area DA1 and the second display area DA2 are display areas that do not overlap each other. It is here assumed that a display area corresponding to the inner surface side of the first chassis 101 in the screen area of the display 150 is the first display area DA1, and a display area corresponding to the inner surface side of the second chassis 102 is the second display area DA2. In the following, a display mode to control the display in the one-screen structure is called a "one-screen mode," and a display mode to control the display in the two-screen structure is called a "two-screen mode."

Note that a touch sensor is provided on the screen area of the display unit 150. The information processing device 10 can detect touch operations to the screen area of the display 150. By putting the information processing device 10 into the open state, a user can visually confirm the display of the display unit 150 provided on the respective inner surfaces of the first chassis 101 and the second chassis 102, and perform touch operations to the display 150, thus enabling use of the information processing device 10.

Next, usage forms and screen modes of the information processing device 10 will be described in detail. First, the usage forms of the information processing device 10 are divided into a state in which the first chassis 101 and the second chassis 102 are bent (Bent form) at an open angle θ between the first chassis 101 and the second chassis 102, and a flat state (Flat form) in which the first chassis 101 and the second chassis 102 are not bent. In the following, the state where the first chassis 101 and the second chassis 102 are bent (Bent form) is simply called the "bent state (Bent form)," and the flat state (Flat form) in which the first chassis 101 and the second chassis 102 are not bent is simply called the "flat state (Flat form)." In the bent state (Bent form), the display 150 provided over the first chassis 101 and the second chassis 102 is also in the bent state. In the flat state (Flat form), the display 150 is also in the flat state.

Figure 2:
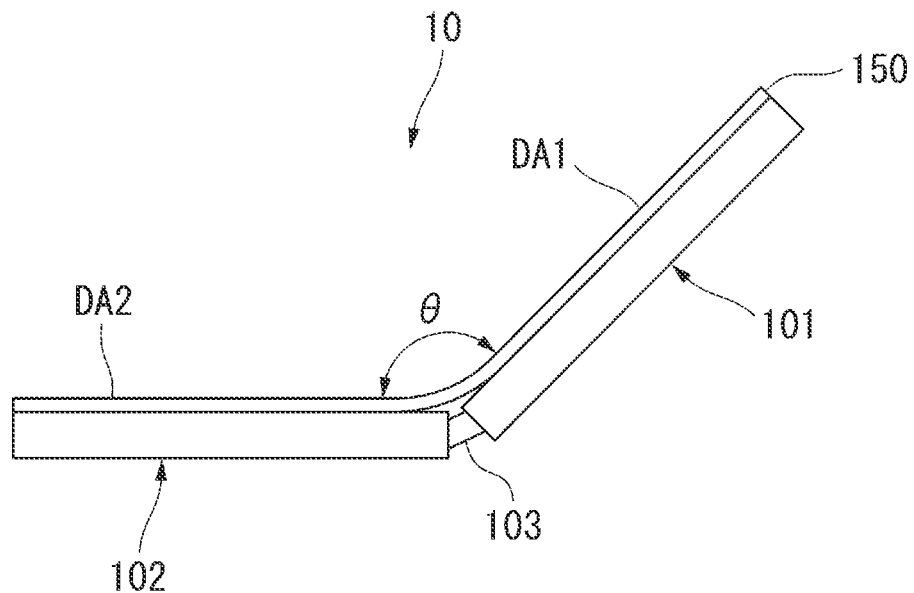
FIG. 2 is a side view illustrating an example of the information processing device in a bent state according to the first embodiment.

FIG. 2 is a side view illustrating an example of the information processing device 10 in the bent state (Bent form). The display 150 is arranged over (across) the first chassis 101 and the second chassis 102. The screen area of the display 150 (the display area DA illustrated in FIG. 1) can be bent by using a part corresponding to the hinge mechanism 103 as a crease, and on the border of the crease, a display area on the side of the first chassis 101 is the first display area DA1 and a display area on the side of the second chassis 102 is the second display area DA2. The display 150 is bent according to the rotation (open angle θ) between the first chassis 101 and the second chassis 102. The information processing device 10 determines whether or not the state is the bent state (Bent form) depending on the open angle θ. As an example, in the case of 10°<θ<170°, the information processing device 10 determines the bent state (Bent form). This state corresponds to a usage form as a so-called clamshell mode or book mode.

Figure 3:
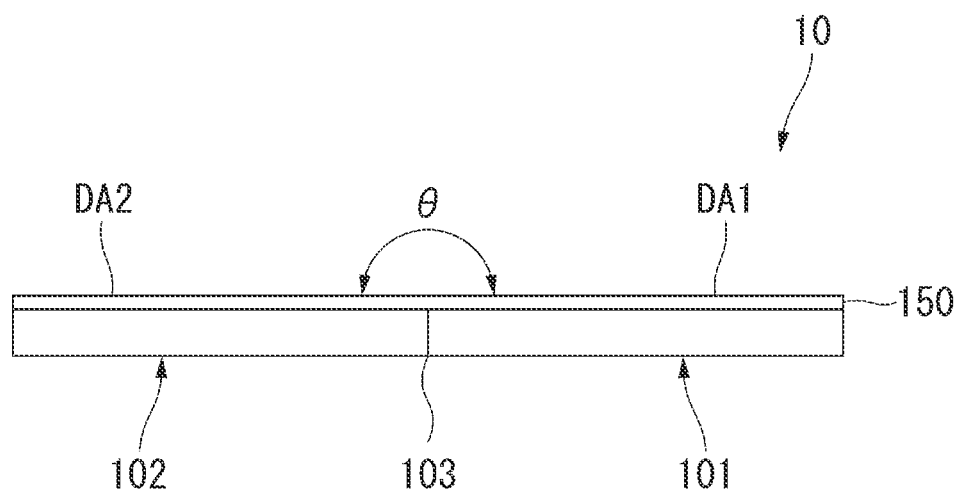
FIG. 3 is a side view illustrating the information processing device in a flat state according to the first embodiment.

FIG. 3 is a side view illustrating an example of the information processing device 10 in the flat state (Flat form). The information processing device 10 typically determines the flat state (Flat form) when the open angle θ is 180°, but as an example, the information processing device 10 may also determine the flat state (Flat form) in the case of 170°≤θ≤180°. For example, when the open angle θ between the first chassis 101 and the second chassis 102 is 180°, the display 150 is also in the flat state. This state corresponds to a usage form as a so-called tablet mode.

Figure 4:
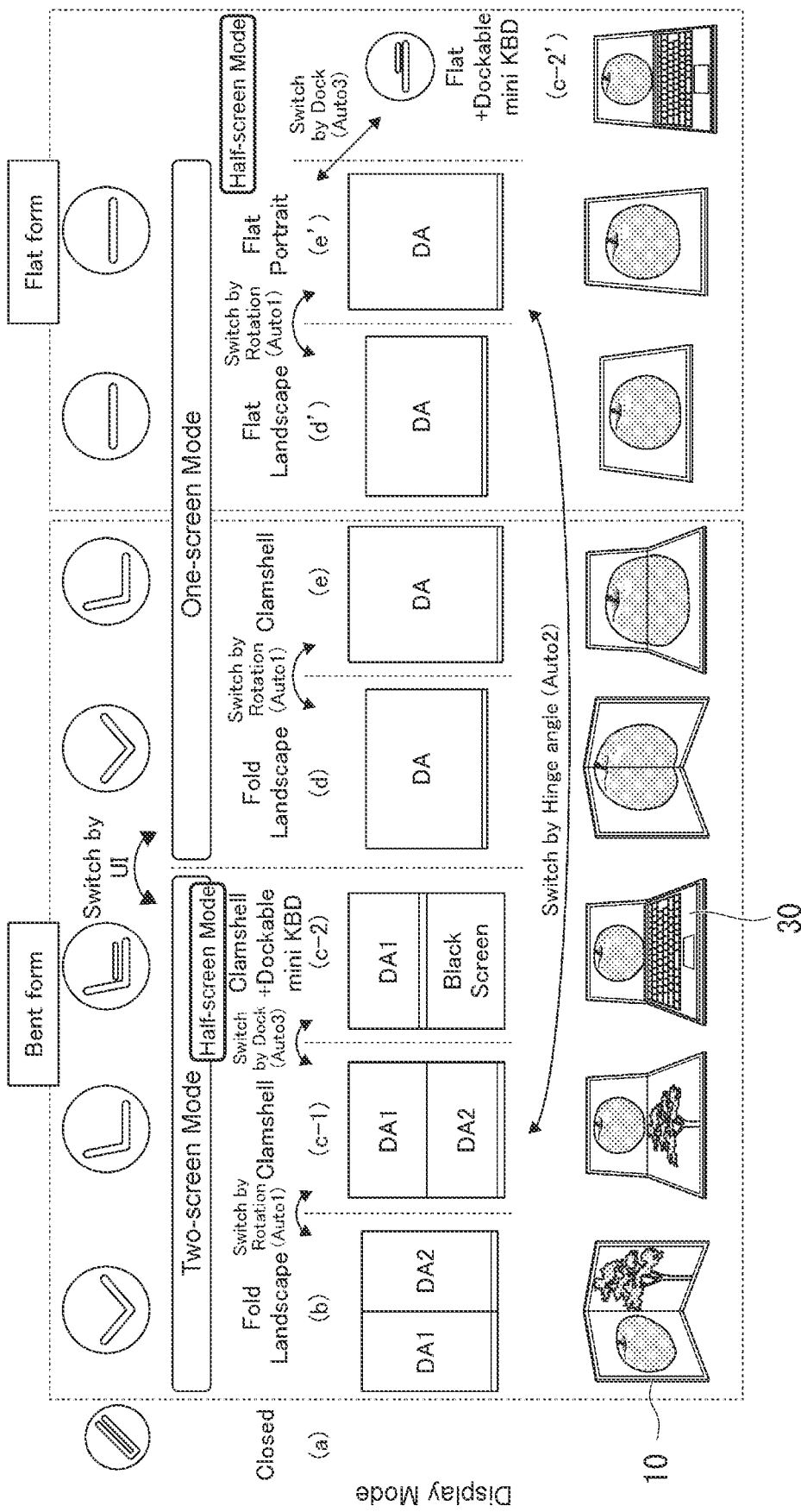
FIG. 4 is a diagram illustrating specific examples of various display modes of the information processing device according to the first embodiment.

Referring next to FIG. 4, display modes in various usage forms of the information processing device 10 will be described in detail.

FIG. 4 is a diagram illustrating specific examples of various display modes of the information processing device 10 according to the present embodiment. The display mode of the information processing device 10 varies depending on the usage form classified by the open angle θ between the first chassis 101 and the second chassis 102, the posture (orientation) of the information processing device 10, whether the display mode is the one-screen mode or the two-screen mode, and the like. Note that one screen is also called a single screen, and two screens are also called split screens or dual screens.

Display mode (a) is a display mode when the first chassis 101 and the second chassis 102 are in the closed state (Closed) as the usage form. For example, in this closed state, the information processing device 10 is in a standby state, such as a sleep state or a hibernation state, and the display unit 150 is in a display-off state. This standby state such as the sleep state or the hibernation state corresponds, for example, to S3 or S4 as system power status defined in the ACPI (Advanced Configuration and Power Interface) specifications.

Display mode (b) is a display mode when the first chassis 101 and the second chassis 102 are in the bent state (Bent form) as the usage form and in the two-screen mode in which display is controlled by splitting the screen area of the display 150 into the two display areas of the first display area DA1 and the second display area DA2. Further, the orientation of the information processing device 10 is an orientation in which the first display area DA1 and the second display area DA2 are lined up side by side in portrait orientation. The portrait orientation of the display areas means an orientation in which long sides of the four sides of each of the rectangular display areas are vertical and short sides are horizontal. When the display areas are in portrait orientation, the display orientation is also portrait, that is, the display is provided in such an orientation that the direction along the long sides corresponds to the up-down direction and the direction along the short sides corresponds to the left-right direction. This usage form is a usage form corresponding to the so-called book mode in which left and right pages when opening a book correspond to left and right screens. Since this usage form is in the bent state (Bent form) and the display area of two combined display areas of the first display area DA1 and the second display area DA2 lined up side by side is horizontally long, it is also called "Fold Landscape."

In this display mode (b), for example, the information processing device 10 is in such a two-screen display mode that the first display area DA1 on the left side is set as the primary screen and the second display area DA2 on the right side is set as the secondary screen in normal operating conditions. Note that the correspondences of the first display area DA1 and the second display area DA2 to the primary screen and the secondary screen in the display mode (b) may be reversed.

Like the display mode (b), display mode (c-1) is a display mode in the bent state (Bent form) when the display mode is the two-screen mode in which the display is so controlled that the screen area of the display 150 is split into two display areas of the first display area DA1 and the second display area DA2, but in a usage form different from the display mode (b) in the orientation of the information processing device 10. The orientation of the information processing device 10 is an orientation in which the first display area DA1 and the second display area DA2 are lined up and down in landscape orientation. The landscape orientation of the display areas means an orientation in which long sides of the four sides of each of the rectangular display areas are horizontal and short sides are vertical. When the display areas are in landscape orientation, the display orientation is also landscape, that is, the display is provided in such an orientation that the direction along the short sides corresponds to the up-down direction and the direction along the long sides corresponds to the left-right direction. This usage form is one of typical usage forms of a clamshell PC.

In this display mode (c-1), for example, the information processing device 10 is in such a two-screen display mode that the first display area DA1 is set as the primary screen and the second display area DA2 is set as the secondary screen in normal operating conditions. Note that the correspondences of the first display area DA1 and the second display area DA2 to the primary screen and the secondary screen in the display mode (c-1) may be reversed.

For example, the information processing device 10 detects a change in the posture (orientation) of the information processing device 10 to automatically switch from the display mode (b) to the display mode (c-1) or from the display mode (c-1) to the display mode (b) (Switch by Rotation). For example, since the display mode (c-1) is in such a state that the display 150 is rotated 90 degrees in the right direction from the state of the display mode (b) in FIG. 4, the information processing device 10 switches to the display mode (c-1) when detecting the rotation of a predetermined angle (for example, 45 degrees) or more in the right direction from the state of the display mode (b). Further, since the display mode (b) is in such a state that the display 150 is rotated 90 degrees in the left direction from the state of the display mode (c-1) in FIG. 4, the information processing device 10 switches to the display mode (b) when detecting the rotation of a predetermined angle (for example, 45 degrees) or more in the left direction from the state of the display mode (c-1).

Like the display mode (c-1), display mode (c-2) is in the bent state (Bent form) with the same orientation of the information processing device 10 but different in that an external keyboard 30 (Dockable mini KBD (KeyBoard)) connectable to the information processing device 10 is connected. This usage form is in such a state that a physical keyboard 30 is connected in general usage forms of the clamshell PC. For example, the size of the keyboard 30 is almost equivalent to the size of the second display area DA2, and the keyboard 30 is configured to be mountable on the second display area DA2. As an example, magnets are provided inside (the edges of) the bottom of the keyboard 30, and when the keyboard 30 is mounted on the second display area DA2, the magnets are attracted to metal parts of the inner surface edges of the second chassis 102 to fix the keyboard 30. Thus, the usage form becomes a usage form similar to that of a conventional clamshell PC with a physical keyboard originally provided therein. Further, the information processing device 10 and the keyboard 30 are connected, for example, through Bluetooth (registered trademark). In this display mode (c-2), since the keyboard makes the second display area DA2 invisible, the information processing device 10 controls the second display area DA2 to black display or display off. In other words, this display mode (c-2) is a display mode in which only a half screen is effective to provide a display (hereinafter called a "half-screen mode"), that is, a one-screen mode in which only the first display area DA1 is used.

For example, the information processing device 10 automatically switches from the display mode (c-1) to the display mode (c-2) when detecting the connection to an external keyboard in the state of the display mode (c-1) (Switch by Dock).

Like the display mode (b), display mode (d) is in the bent state (Bent form) with the same orientation of the information processing device 10 but different in that the display mode (d) is the one-screen mode in which the entire screen area of the display 150 is set as one display area DA to control the display. This usage form is in the one-screen mode different from that in the display mode (b). However, since the usage form is in the bent state (Bent form) and the display area DA is horizontally long, it is also called "Fold Landscape." The display area DA is in landscape orientation and the display orientation is also landscape.

Here, for example, switching between the one-screen mode and the two-screen mode in the bent state (Bent form) is performed with a user operation. For example, the information processing device 10 displays an operator as a UI (User Interface) capable of switching between the one-screen mode and the two-screen mode somewhere on the screen to switch from the display mode (b) to the display mode (d) based on an operation to the operator (Switch by UI). A specific example of this display mode switching operation will be described later.

Like the display mode (c-1), display mode (e) is in the bent state (Bent form) with the same orientation of the information processing device 10 but different in that the display mode (e) is the one-screen mode in which the entire screen area of the display 150 is set as one display area DA to control the display. This usage form is different from the display mode (c-1) in that it is the one-screen mode, but the usage form is considered to correspond to the usage form of the clamshell PC from the bent state (Bent form) and the orientation of the information processing device 10. The display area DA is in portrait orientation and the display orientation is also portrait.

For example, the information processing device 10 detects a change in the posture (orientation) of the information processing device 10 to automatically switch from the display mode (d) to the display mode (e) or from the display mode (e) to the display mode (d) (Switch by Rotation). For example, since the display mode (e) is in such a state that the display 150 is rotated 90 degrees in the right direction from the state of the display mode (d) in FIG. 4, the information processing device 10 switches to the display mode (e) when detecting the rotation of a predetermined angle (for example, 45 degrees) or more in the right direction from the state of the display mode (d). Further, since the display mode (d) is in such a state that the display 150 is rotated 90 degrees in the left direction from the state of the display mode (e) in FIG. 4, the information processing device 10 switches to the display mode (d) when detecting the rotation of a predetermined angle (for example, 45 degrees) or more in the left direction from the state of the display mode (e).

Like the display mode (d), display mode (d') is in the one-screen mode and the orientation of the information processing device 10 is such an orientation that the display area DA is horizontally long, but different in that the information processing device 10 is in the flat state (Flat form). The flat state (Flat form) is a state in which the open angle θ between the first chassis 101 and the second chassis 102 is substantially 180°. This usage form corresponds to the so-called tablet mode described with reference to FIG. 3. Since this usage form is in the flat state (Flat form) and the display area DA is horizontally long, it is also called "Flat Landscape." This display mode (d') differs from the display mode (d) only in the open angle θ between the first chassis 101 and the second chassis 102. Like in the display mode (d), the display area DA in the display mode (d') is in landscape orientation and the display orientation is also landscape.

Like the display mode (e), display mode (e') is in the one-screen mode and the orientation of the information processing device 10 is such an orientation that the display area DA is vertically long, but different in that the information processing device 10 is in the flat state (Flat form). Since this usage form is in the flat state (Flat form) and the display area DA is vertically long, it is also called "Flat Portrait." This display mode (e') differs from the display mode (e) only in the open angle θ between the first chassis 101 and the second chassis 102. Like in the display mode (e), the display area DA in the display mode (e') is in portrait orientation and the display orientation is also portrait.

For example, the information processing device 10 detects a change in the posture (orientation) of the information processing device 10 to automatically switch from the display mode (d') to the display mode (e') or from the display mode (e') to the display mode (d') (Switch by Rotation). For example, since the display mode (e') is in such a state that the display 150 is rotated 90 degrees in the right direction from the state of the display mode (d') in FIG. 4, the information processing device 10 switches to the display mode (e') when detecting the rotation of a predetermined angle (for example, 45 degrees) or more in the right direction from the state of the display mode (d'). Further, since the display mode (d') is in such a state that the display 150 is rotated 90 degrees in the left direction from the state of the display mode (e') in FIG. 4, the information processing device 10 switches to the display mode (d') when detecting the rotation of a predetermined angle (for example, 45 degrees) or more in the left direction from the state of the display mode (e').

Note that in the display mode (d') and the display mode (e'), it is also possible to switch to the two-screen mode while keeping the flat state (Flat form) by the user operating a display mode switching icon to be described later. For example, when switching to the two-screen mode from the state of the display mode (d'), the display state becomes similar to the display mode (b) though the usage form is in the flat state (Flat form). Further, when switching to the two-screen mode from the state of the display mode (e'), the display state becomes similar to the display mode (c-1) though the usage form is in the flat state (Flat form).

Further, when detecting the connection with the keyboard 30 in the state of the display mode (e'), the information processing device 10 automatically switches from the display mode (e') to display mode (c-2') (Switch by Dock). The display mode (c-2') is in the flat state (Flat form) but different from the display mode (c-2) only in the open angle θ between the first chassis 101 and the second chassis 102. In this display mode (c-2'), since the second display area DA2 becomes invisible by the keyboard, the information processing device 10 performs control to provide a black display or turn off the display. In other words, like the display mode (c-2), this display mode (c-2') is a half-screen mode in which only one screen as a half screen is effective to provide a display.

Further, when detecting a change from the flat state (Flat form) to the bent state (Bent form), the information processing device 10 can switch from the one-screen mode to the two-screen mode. For example, when detecting a change to the bent state (Bent form) in the state of the display mode (d') based on the open angle θ between the first chassis 101 and the second chassis 102, the information processing device 10 automatically switches from the display mode (d') to the display mode (b). Further, when detecting a change to the bent state (Bent form) in the state of the display mode (e') based on the open angle θ between the first chassis 101 and the second chassis 102, the information processing device 10 automatically switches from the display mode (e') to the display mode (c-1).

(Display Mode Switching Operation)

Next, a specific example of operation specifications upon switching the display mode with user operations will be described.

Figure 5A:
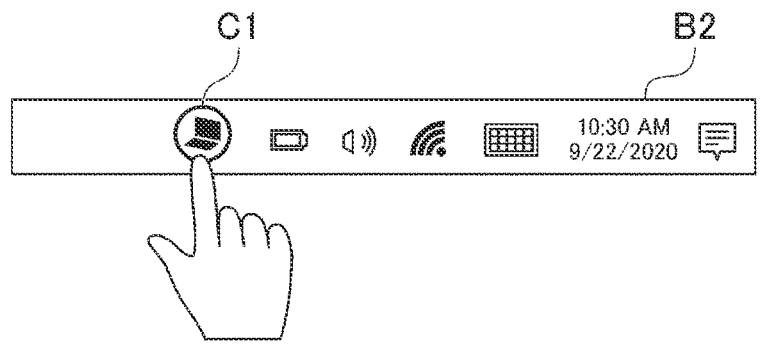
FIGS. 5(A)-(C) are diagrams illustrating an example of the operation specifications of display mode switching operations according to the first embodiment.

FIG. 5 is a diagram illustrating an example of the operation specifications of the display mode switching operations according to the present embodiment. For example, as illustrated in FIG. 5(A), icon C1 to display a display mode switching menu is displayed on a task bar B2. The task bar B2 is displayed in either one of the display areas inside the screen area of the display 150. For example, the task bar B2 is displayed only in one place inside the screen area of the display 150 (for example, on the bottom of the display area) regardless of whether the screen mode is the one-screen mode or the two-screen mode. However, in the case of the two-screen mode, the task bar B2 may be displayed in the first display area DA1 and the second display area DA2 (at the bottom of each of the display areas).

When the icon C1 is operated to display the switching menu, the display mode switching menu is displayed as a pop-up screen. Note that the display mode switching menu may also be displayed as a pop-up screen upon a change from the bent state (Bent form) to the flat state (Flat form) in which the information processing device 10 is not bent. Further, the display mode switching menu may be displayed as a pop-up screen upon a change from the flat state (Flat form) to the bent state (Bent form).

On the switching menu, display mode switching icons are displayed as choices of the display mode to allow the user to instruct switching between the one-screen mode and the two-screen mode, and the replacement of pieces of display data to be displayed respectively in the first display area DA1 and the second display area DA2 in the two-screen mode (replacement of the primary screen and the secondary screen). On the switching menu, choices of the display mode selectable by the user depending on the usage form (the orientation of the display 150) at the time are displayed.

Figure 5B:
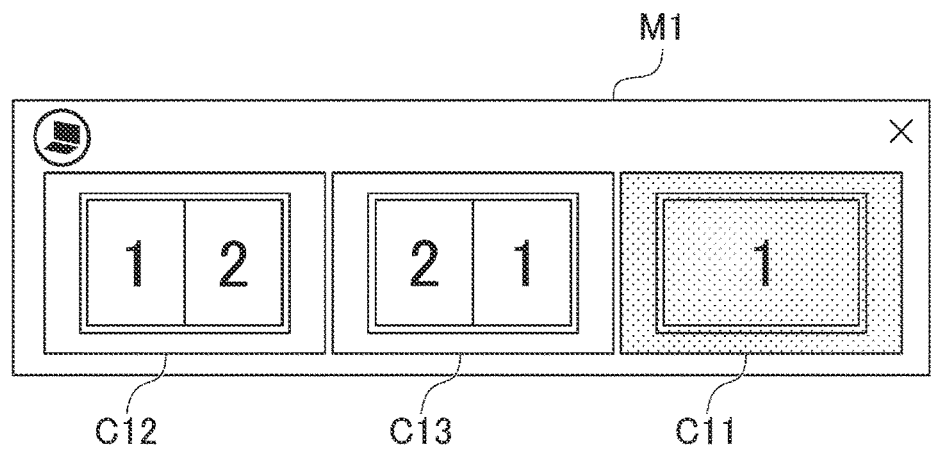

FIG. 5(B) illustrates switching menu M1 displayed when the usage form is "Landscape" (display mode (b), display mode (d), display mode (d'), etc.). Note that "1" in FIG. 5(B) indicates the primary screen, and "2" indicates the secondary screen. On the switching menu M1, display mode switching icon C11, display mode switching icon C12, and display mode switching icon C13 are displayed. The display mode switching icon C11 is displayed as an operator for selecting the one-screen mode (the display mode (d) or the display mode (d')). The display mode switching icon C12 is displayed as an operator for selecting such a display mode that the first display area DA1 is the primary screen and the second display area DA2 is the secondary screen in the two-screen mode (the display mode (b)). The display mode switching icon C13 is displayed as an operator for selecting such a display mode that the second display area DA2 is the primary screen and the first display area DA1 is the secondary screen in the two-screen mode (the display mode (b)). In the following, the two-screen mode in which the second display area DA2 is the primary screen and the first display area DA1 is the secondary screen is called an "inverted two-screen mode" when there is a need to distinguish from the two-screen mode in which the first display area DA1 is the primary screen and the second display area DA2 is the secondary screen.

Note that the display mode switching icon corresponding to the current display mode is displayed in a display form distinguishable from the other display mode switching icons. Here, the display mode switching icon C11 is highlighted against the other display mode switching icons C12 and C13 to make the user understand the current display mode.

Figure 5C:
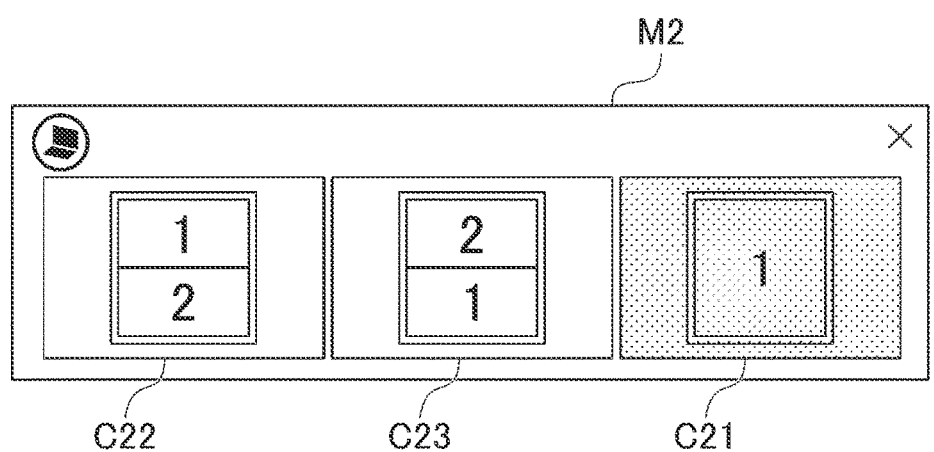

FIG. 5(C) illustrates switching menu M2 to be displayed when the usage form is "Clamshell" (display mode (c-1), display mode (e), display mode (e'), etc.). On the switching menu M2, display mode switching icon C21, display mode switching icon C22, and display mode switching icon C23 are displayed. The display mode switching icon C21 is displayed as an operator for selecting the one-screen mode (the display mode (e) or the display mode (e')). The display mode switching icon C22 is displayed as an operator for selecting such a display mode that the first display area DA1 is the primary screen and the second display area DA2 is the secondary screen in the two-screen mode (the display mode (c-1)). The display mode switching icon C23 is displayed as an operator for selecting such a display mode that the second display area DA2 is the primary screen and the first display area DA1 is the secondary screen in the two-screen mode (the display mode (c-1)) (that is, the inverted two-screen mode).

Like the switching menu M1 illustrated in FIG. 5(B), the display mode switching icon corresponding to the current display mode is displayed in a display form distinguishable from the other display mode switching icons. Here, the display mode switching icon C21 is highlighted against the other display mode switching icons C22 and C23 to make the user understand the current display mode.

The user can arbitrarily select any of the display mode switching icons displayed on the switching menu M1 or the switching menu M2. When the user selects any of the display mode switching icons, the display of the switching menu is ended. Otherwise, when the user does not select any of the display mode switching icons even after the passage of a predetermined time period (for example, three to five seconds) after the switching menu M1 or the switching menu M2 is displayed, the display of the switching menu is ended. Further, in a case where the user operates a close button "x" in the top right of the switching menu, when the user performs an operation outside the screen of the pop-up switching menu, or when the orientation of the information processing device 10 is changed, the display of the switching menu is ended. Note that in the state where the keyboard 30 is connected, since the screen mode is fixed to the half-screen mode (display mode (c-2)) in which only the display of the first display area DA1 is enabled, no switching menu is displayed.

Note that the UI to switch between the one-screen mode and the two-screen mode is not limited to the example illustrated in FIG. 5, and any other UI can be used. For example, an icon to switch between the one-screen mode and the two-screen mode alternately each time it is operated, or an icon to switch among the one-screen mode, the two-screen mode, and the inverted two-screen mode in order each time it is operated may be displayed on the task bar B2.

(Display Control Upon Switching Between One-Screen Mode and Two-Screen Mode)

Next, display control upon switching between the one-screen mode and the two-screen mode (or the inverted two-screen mode) will be described. In the following description, when there is no distinction between the two-screen mode and the inverted two-screen mode, they are collectively called the two-screen mode. First, a display example upon switching from the one-screen mode to the two-screen mode will be described.

Upon transition from the one-screen mode to the two-screen mode, the information processing device 10 displays an active window of a running application (hereinafter simply called an "app") on the primary screen of the two screens, and displays thumbnail images of inactive windows on the secondary screen. The active window is a window being currently selected as a user operation target, that is, a window being displayed in the foreground of the display 150. The active window to be displayed on the primary screen is a window displayed as the active window in the one-screen mode immediately before the transition to the two-screen mode. On the other hand, the inactive windows are windows other than the active window in the one-screen mode immediately before the transition to the two-screen mode. In the following, a window in which thumbnail images of inactive windows are displayed is also called a "thumbnail window."

Figure 6:
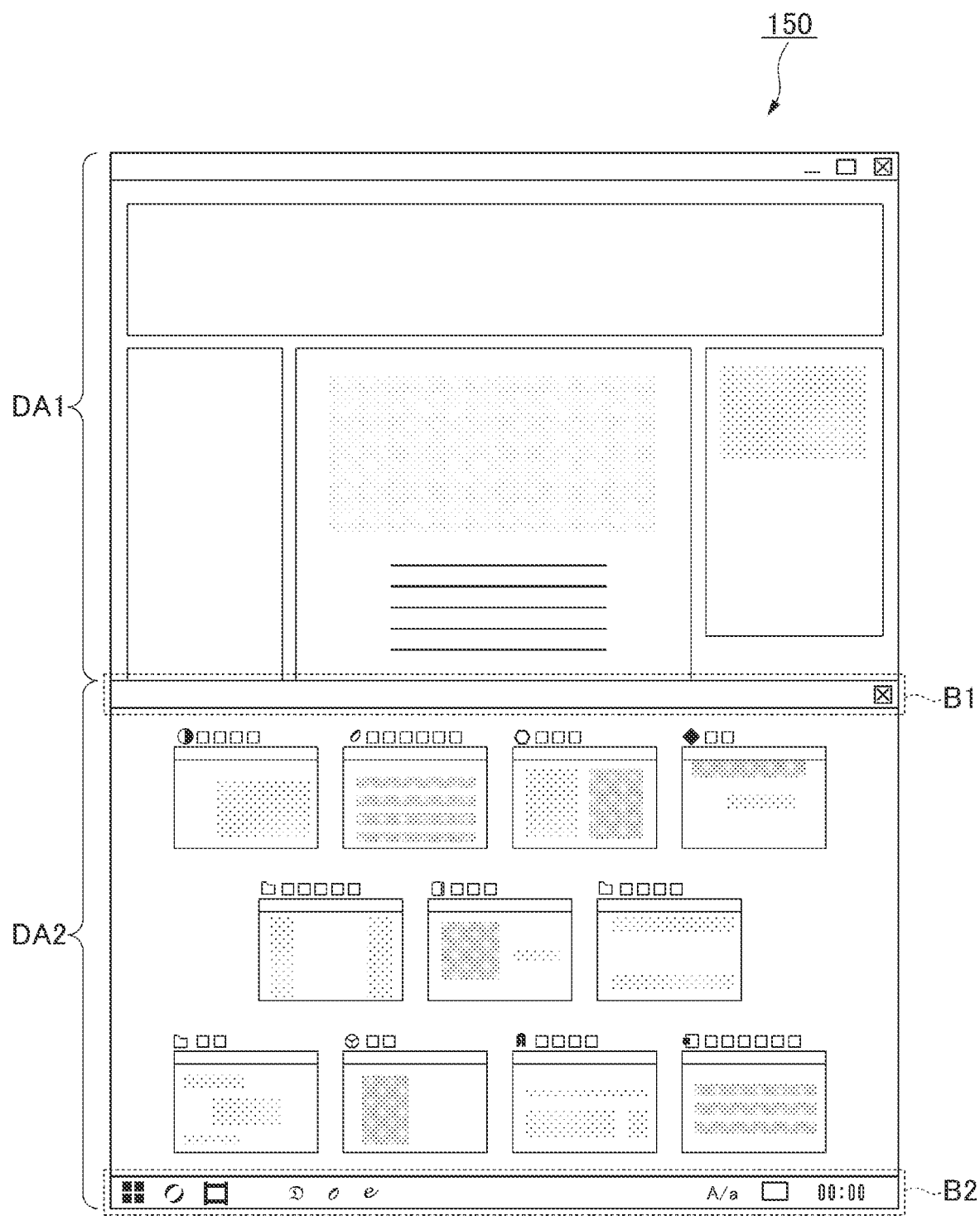
FIG. 6 is a diagram illustrating a display example of a two-screen mode according to the first embodiment.

FIG. 6 is a diagram illustrating a display example of the two-screen mode according to the present embodiment. Here, a display example of the two-screen mode in the display mode (c-1) illustrated in FIG. 4 is illustrated. This usage form is a usage form in a typical two-screen mode of a clamshell PC, where the first display area DA1 and the second display area DA2 are lined up and down vertically in landscape orientation. The landscape orientation of the display areas means an orientation where the long sides of the four sides of each rectangular display area are in a lateral direction and the short sides are in a longitudinal direction. The longitudinal direction corresponds to the vertical (up and down) direction, and the lateral direction corresponds to the horizontal (right and left) direction. The vertical direction is typically a perpendicular direction. In other words, the first display area DA1 and the second display area DA2 are so arranged that a lower-side edge in the display orientation of the first display area DA1 comes to the side of an upper-side edge in the display orientation of the second display area DA2. Here, the first display area DA1 corresponds to the primary screen and the second display area DA2 corresponds to the secondary screen. Note that in the case of the inverted two-screen mode, the second display area DA2 is the primary screen and the first display area DA1 is the secondary screen.

Upon transition from the one-screen mode to the two-screen mode, the information processing device 10 displays, in the first display area DA1 (primary screen), the active window of the app running in the one-screen mode. For example, upon transition to the two-screen mode, the information processing device 10 displays the active window, which was displayed in the display area DA in the one-screen mode, in the foreground as the active window over the entire display area of the first display area DA1 (full-screen display). Further, upon transition to the two-screen mode, the information processing device 10 adapts a window as an inactive window in the one-screen mode to a layer behind the foreground in which the active window of the first display area DA1 is displayed in such a state as to maintain a layer relationship (the stacking order of windows) in the one-screen mode. Thus, the full-screen display of the active window is provided in the first display area DA1, and the inactive window is not displayed (cannot be viewed by the user) though it exists in the layer behind the active window.

Further, upon transition from the one-screen mode to the two-screen mode, the information processing device 10 generates a thumbnail image of a window that was the inactive window in the one-screen mode, and displays the thumbnail window in the second display area DA2 (secondary screen). When there are two or more inactive windows, the information processing device 10 displays, in the second display area DA2, the thumbnail window in which thumbnail images of the two or more inactive windows are lined up. When any one of the thumbnail images is selected with a user operation (for example, a tap operation), the information processing device 10 closes (hides) the thumbnail window displayed in the second display area DA2, and displays an inactive window corresponding to the selected thumbnail image in the second display area DA2 as an active window. Specifically, as an example, the information processing device 10 moves the inactive window corresponding to the selected thumbnail image from the first display area DA1 to the second display area DA2, and displays, in maximized form, the inactive window as an active window in the second display area DA2 (provides the full-screen display inside the second display area DA2).

For example, in the thumbnail window, thumbnail images (reduced images) of one or more windows are displayed side by side. A title bar B1 is displayed on the upper edge of the thumbnail window. A close button "x" at the right end of the title bar B1 is displayed as an operator used to close the thumbnail window. The user can also close (hide) all the thumbnail images by operating the close button "x" on this title bar B1 (for example, with a tap operation).

Note that inactive windows existing in layers behind the active window in the first display area DA1 (that is, real forms of inactive windows (real windows) displayed as thumbnail images in the second display area DA2) may be stacked one above the other in the same size according to the priority in such a manner to be hidden behind the active window, or may be stacked one above the other according to the priority in a size smaller than the active window. Further, all inactive windows existing in layers behind the active window in the first display area DA1 (that is, real forms of inactive windows (real windows) displayed as thumbnail images in the second display area DA2) may be once miniaturized (for example, in a state where only icons exist on a task bar in Windows (registered trademark)), or when the thumbnail window is not displayed as a semi-transparent (see-through) display, it does not matter if the inactive windows are stacked behind the active window. In short, it is only necessary to process the real forms of the inactive windows (real windows) displayed as thumbnail images in the second display area DA2 in a manner not to be viewed temporarily by the user. After that, in the second display area DA2, only a window of a thumbnail image of an app selected in the thumbnail window is displayed as an active window in the foreground.

Further, the task bar B2 displayed on the lower edge of the second display area DA2 corresponds to the task bar B2 illustrated in FIG. 5, which is displayed in one place as a task bar common to the first display area DA1 and the second display area DA2. Note that the position of displaying the task bar B2 may also be the left edge or the right edge of the first display area DA1 or the second display area DA2, or the upper edge of the first display area DA1. Further, as described above, task bars may be displayed in both the first display area DA1 and the second display area DA2, respectively. The application of embodiments of the present invention is not limited by the position where the task bar is displayed.

Thus, upon transition from the one-screen mode to the two-screen mode, the active window, which was displayed in the display area DA in the one-screen mode, is displayed in the first display area DA1 (primary screen), and the thumbnail window is displayed in the second display area DA2 (secondary screen). Further, when any one of the thumbnail images in the thumbnail window displayed in the second display area DA2 is selected, an inactive window corresponding to the selected thumbnail image is displayed in the second display area DA2 as an active window.

Next, a display example upon switching to the one-screen mode again after switching from the one-screen mode to the two-screen mode will be described. Upon switching from the one-screen mode to the two-screen mode, the information processing device 10 stores the position and size of each window in the one-screen mode. After that, when switching from the two-screen mode to the one-screen mode is done again, each window is displayed by reproducing the position and size of the window based on the stored position and size.

Here, for example, the position of the window is indicated by the coordinates of the screen area (desktop area) of the display 150. For example, the upper-left corner of the screen area is set as the coordinate origin to store the coordinates of the upper-left corner of each window. Further, the size of the window is stored by setting a difference in coordinates at both ends of the window in the longitudinal direction as a vertical size and setting a difference in coordinates at both ends of the window in the lateral direction as a horizontal size.

FIG. 7 is a diagram illustrating a first example of display upon switching between the one-screen mode and the two-screen mode according to the present embodiment. FIG. 7(A) illustrates a display example in the one-screen mode. For example, this display mode corresponds to the display mode (e) illustrated in FIG. 4. In the display area DA, windows of plural running apps are displayed. Specifically, one active window AW and plural inactive windows other than the active window AW are displayed in the display area DA. In response to switching from the one-screen mode to the two-screen mode, the information processing device 10 stores and holds the position and size of the window of each app running in the one-screen mode before switching.

FIG. 7(B) illustrates a display example after switching from the one-screen mode to the two-screen mode. For example, this display mode corresponds to the display mode (c-1) illustrated in FIG. 4. The active window AW in the one-screen mode before switching is displayed in the first display area DA1 (primary screen). Further, the thumbnail window of thumbnail images of inactive windows in the one-screen mode before switching is displayed in the second display area DA2 (secondary screen). This display of the two-screen mode corresponds to the display example described with reference to FIG. 6.

FIG. 7(C) illustrates a display example when switching from the two-screen mode to the one-screen mode is done again. Based on the held position and size of each window, the information processing device 10 displays the window by reproducing the position and size of the window in the last one-screen mode. As illustrated, in the display area DA, the one active window AW and the plural inactive windows other than the active window AW are reproduced and displayed in the same position and size as those in FIG. 7(A).

FIG. 8 is a diagram illustrating a second example of display upon switching from the one-screen mode to the two-screen mode according to the present embodiment. This illustrated example is a display example in which, after switching from the one-screen mode to the two-screen mode, the posture (orientation) of the information processing device 10 is changed (the display 150 is rotated), and then switching to the one-screen mode is done again.

The display examples of FIG. 8(A) and FIG. 8(B) are the same as the display examples of FIG. 7(A) and FIG. 7(B). In response to switching from the one-screen mode illustrated in FIG. 8(A) to the two-screen mode illustrated in FIG. 8(B), the information processing device 10 stores and holds the position and size of the window of each app running in the one-screen mode before switching.

FIG. 8(C) illustrates a display example when the information processing device 10 is rotated 90 degrees to the left from the state illustrated in FIG. 8(B). Like in FIG. 8(B), the active window AW is displayed in the first display area DA1 (primary screen), and the thumbnail window is displayed in the second display area DA2 (secondary screen), but the display orientation is changed from landscape to portrait. For example, this display mode corresponds to the display mode (b) illustrated in FIG. 4.

FIG. 8(D) illustrates a display example when switching from the two-screen mode illustrated in FIG. 8(C) to the one-screen mode is done again. For example, this display mode corresponds to the display mode (d) illustrated in FIG. 4, which is in such a state that the information processing device 10 in the one-screen mode illustrated in FIG. 8(A) (for example, corresponding to the display mode (e) illustrated in FIG. 4) is rotated 90 degrees to the left. Even in this case, based on the held position and size of each window, the information processing device 10 displays the window by reproducing the position and size of the window in the one-screen mode (the last one-screen mode) illustrated in FIG. 8(A) (with the upper-left corner used as the origin). As illustrated, one active window AW and plural inactive windows other than the active window AW are reproduced and displayed in the display area DA with the same positions and sizes as those in FIG. 8(A). In this example, since the display position and size of each window illustrated in FIG. 8(D) are the same as those in FIG. 8(A), part of each window sticks out of the screen (in the downward direction) due to the change in the screen orientation. For example, the information processing device 10 can adjust the size or shift the position to make the window fit in the screen.

Note that the same is true even if the secondary screen and the primary screen are replaced with each other (i.e., switching between the two-screen mode and the inverted two-screen mode is done) before switching from the two-screen mode to the one-screen mode again. Upon switching from the two-screen mode to the one-screen mode again, the information processing device 10 reproduces and displays the position and size of each window in the last one-screen mode based on the held position and size of the window.

Further, upon switching to the one-screen mode again after switching to the two-screen mode, the window of an app displayed in maximized form (full-screen displayed) in the one-screen mode is displayed in the maximized form (full-screen displayed) in the same manner.

Thus, when switching to the one-screen mode is done again, since the information processing device 10 returns the display state of each window to the display state in the last one-screen mode to match the user's favorite usage status, it is convenient. Therefore, the information processing device 10 can properly control display upon switching between the one-screen mode and the two-screen mode.

(Configuration of Information Processing Device 10)

A specific configuration of the information processing device 10 will be described below.

Figure 9:
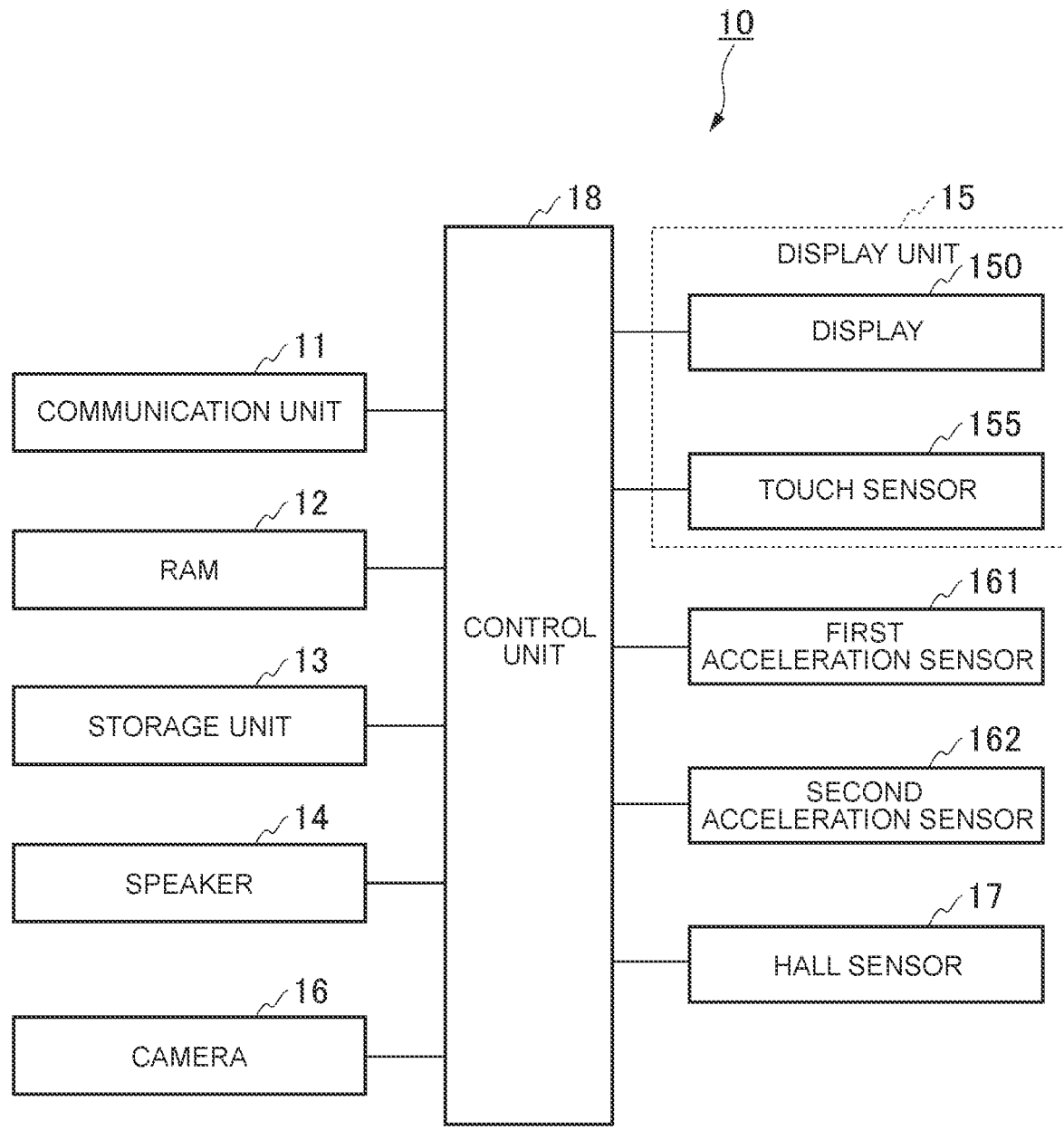
FIG. 9 is a block diagram illustrating a hardware configuration example of the information processing device according to the first embodiment.

FIG. 9 is a block diagram illustrating an example of the hardware configuration of the information processing device 10 according to the present embodiment. The information processing device 10 includes a communication unit 11, a RAM (Random Access Memory) 12, a storage unit 13, a speaker 14, a display unit 15, a camera 16, a first acceleration sensor 161, a second acceleration sensor 162, a Hall sensor 17, and a control unit 18. These units are connected communicably to one another through a bus or the like.

The communication unit 11 is, for example, configured to include digital input/output ports such as two or more Ethernet (registered trademark) ports and two or more USB (Universal Serial Bus) ports, communication devices for performing wireless communication such as Bluetooth (registered trademark) and Wi-Fi (registered trademark), and the like. For example, the communication unit 11 can communicate with the above-described external keyboard 30 and the like by using Bluetooth (registered trademark).

In the RAM 12, programs and data for processing executed by the control unit 18 are expanded, and various data are saved or deleted as appropriate. For example, the RAM 12 functions also as a video memory (V-RAM) for the display of the display 150. As an example, the RAM 12 functions as a video memory for data displayed in the display area DA when the display 150 is controlled in the one-screen mode. Further, the RAM 12 functions as a video memory for data displayed in the first display area DA1 and the second display area DA2 when the display 150 is controlled in the two-screen mode. Further, information on running apps, an app in use (an app as an active window) among the running apps, information on the other apps as inactive windows, information about in which display area each window is displayed, and the like are stored in the RAM 12. Note that, since the RAM 12 is a volatile memory, no data is held after the supply of power is stopped. Data necessary to be held when the power supply to the RAM 12 is stopped is moved to the storage unit 13.

The storage unit 13 is configured to include one or more of an SSD (Solid State Drive), an HDD (Hard Disk Drive), a ROM (Read Only Memory), a Flash-ROM, and the like. For example, in the storage unit 13, a BIOS (Basic Input Output System) program and setting data, an OS (Operating System) and app programs running on the OS, various data used in the apps, and the like are stored.

The speaker 14 outputs electronic sound, voice, and the like.

The display unit 15 includes the display 150 and a touch sensor 155. As described above, the display 150 is a flexible display flexible according to the open angle θ by the relative rotation between the first chassis 101 and the second chassis 102. Under the control of the control unit 18, the display 150 provides a display corresponding to each display mode described with reference to FIG. 4. The touch sensor 155 is provided on the screen of the display 150 to detect a touch operation on the screen. For example, in the one-screen mode, the touch sensor 155 detects a touch operation in the display area DA. Further, in the two-screen mode, the touch sensor 155 detects a touch operation(s) in either or both of the first display area DA1 and the second display area DA2. The touch operations include a tap operation, a slide operation, a flick operation, a swipe operation, a pinch operation, and the like. The touch sensor 155 detects a touch operation and outputs, to the control unit 18, operation information based on the detected operation.

The camera 16 is configured to include a lens, an image sensor, and the like. The camera 16 captures an image (still image or video) under the control of the control unit 18 and outputs data of the captured image.

The first acceleration sensor 161 is provided inside the first chassis 101 to detect the orientation of the first chassis 101 and a change in orientation. For example, when a direction parallel to the long-side direction of the first display area DA1 is set as an X1 direction, a direction parallel to the short-side direction of the first display area DA1 is set as a Y1 direction, and a direction perpendicular to the X1 direction and the Y1 direction is set as a Z1 direction, the first acceleration sensor 161 detects acceleration in the X1 direction, the Y1 direction, and the Z1 direction, respectively, and outputs the detection results to the control unit 18.

The second acceleration sensor 162 is provided inside the second chassis 102 to detect the orientation of the second chassis 102 and a change in orientation. For example, when a direction parallel to the long-side direction of the second display area DA2 is set as an X2 direction, a direction parallel to the short-side direction of the second display area DA2 is set as a Y2 direction, and a direction perpendicular to the X2 direction and the Y2 direction is set as a Z2 direction, the second acceleration sensor 162 detects acceleration in the X2 direction, the Y2 direction, and the Z2 direction, respectively, and outputs the detection results to the control unit 18.

The Hall sensor 17 is provided to detect the connection of the keyboard 30. For example, when the keyboard 30 is mounted on the second display area DA2 of the second chassis 102, a magnetic field changes due to the approach of a magnet provided inside the bottom of the keyboard 30 to change the detection value (output value) of the Hall sensor 17. In other words, the Hall sensor 17 outputs a different detection result depending on whether or not the keyboard 30 is mounted.

The control unit 18 is configured to include processors such as a CPU (Central Processing Unit), a GPU (Graphic Processing Unit), and a microcomputer to implement various functions by executing programs (BIOS, OS, and various programs running on the OS) stored in the storage unit 13 and the like. For example, based on the detection results of the first acceleration sensor 161 and the second acceleration sensor 162, the control unit 18 detects the posture (orientation) of the information processing device 10. Further, based on the detection results of the first acceleration sensor 161 and the second acceleration sensor 162, the control unit 18 detects whether the information processing device 10 is in the open state or the closed state, and in the open state, the control unit 18 detects whether the information processing device 10 is in the bent state (Bent form) or the flat state (Flat form).

Further, the control unit 18 detects a display mode switching operation by the user (for example, an operation on a display mode switching icon illustrated in FIG. 5). Further, based on the detection result of the Hall sensor 17, the control unit 18 detects the connection with the keyboard 30. Note that the connection with this keyboard 30 means the mounting of the keyboard 30 on the second display area DA2, but does not mean communication connection. As for the communication connection with the keyboard 30, the control unit 18 detects it using the function of Bluetooth (registered trademark) or the like.

Further, the control unit 18 performs display control on the display 150 described with reference to FIG. 4 and FIG. 5 by detecting the system state, the posture (orientation) of the information processing device 10, whether the information processing device 10 is in the open state or the closed state, whether the information processing device 10 is in the bent state (Bent form) or the flat state (Flat form) in the case of the open state, the display mode switching operation by the user, the connection with the keyboard 30, and the like.

Next, a functional configuration related to display control processing among pieces of processing executed by the control unit 18 will be described.

Figure 10:
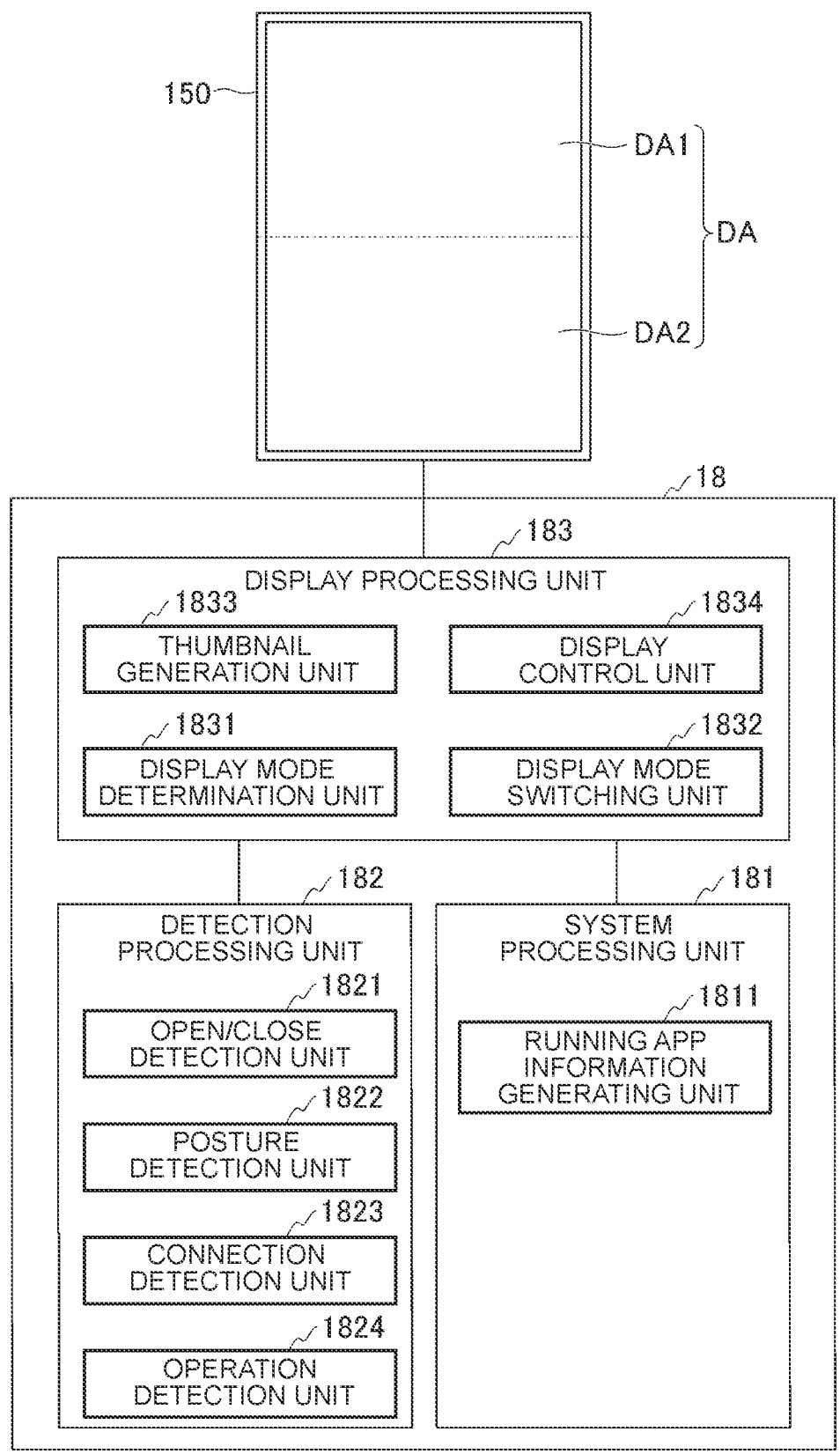
FIG. 10 is a block diagram illustrating a functional configuration example related to display control processing according to the first embodiment.

FIG. 10 is a block diagram illustrating an example of the functional configuration related to the display control processing according to the present embodiment. The control unit 18 includes a system processing unit 181, a detection processing unit 182, and a display processing unit 183. Here, the system processing unit 181 is a functional component the processing of which is executed by the CPU based, for example, on the OS or the BIOS. Further, the detection processing unit 182 is a functional component to cause a microcomputer other than the CPU that executes processing based, for example, on the OS or the BIOS to execute various detection processing. The display processing unit 183 is a functional component the processing of which is executed by the CPU based, for example, on a program running on the OS.

The system processing unit 181 boots the OS and executes various programs such as drivers and apps running on the OS. Further, the system processing unit 181 has a running app information generating unit 1811. The running app information generating unit 1811 generates app information including running app identification information (for example, app IDs), information indicative of an app being used by the user among running apps, i.e., an app the window of which is active), and the like. Further, the running app information generating unit 1811 generates window information indicative of the position and size of the window of each running app. The running app information generating unit 1811 stores and holds the generated app information and window information in the RAM 12.

Figures 11, 12:
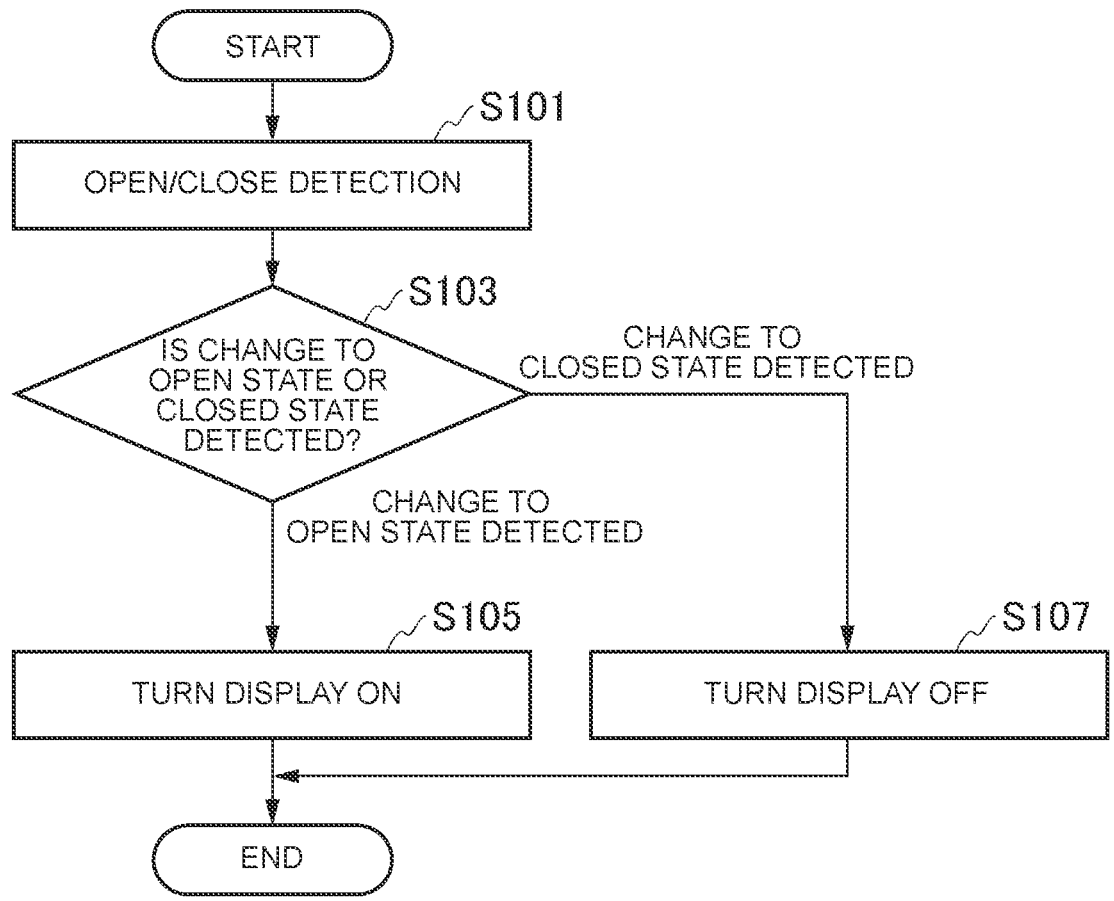
FIG. 11 is a table illustrating an example of window information according to the first embodiment.
FIG. 12 is a flowchart illustrating an example of display control processing based on open/close detection according to the first embodiment.

FIG. 11 is a table illustrating an example of the window information according to the present embodiment. In the illustrated window information, app ID, window position coordinates (x, y), and window size (vertical and horizontal size) are stored in association with one another. For example, the window position coordinates are the position coordinates of the upper-left corner of each window when the upper-left corner of the screen area is set as the coordinate origin. Further, the window size includes a coordinate difference between both ends of the window in the vertical direction (vertical size) and a coordinate difference between both ends of the window in the horizontal direction (horizontal size). Further, when the window is maximized, information indicating that the window is maximized is stored. For example, in response to switching from the one-screen mode to the two-screen mode, the running app information generating unit 1811 stores and holds, in the RAM 12, the window information of running applications in the one-screen mode before the switching.

Returning to FIG. 10, the detection processing unit 182 has an open/close detection unit 1821, a posture detection unit 1822, and a connection detection unit 1823 as functional components to detect the state of the information processing device 10. The open/close detection unit 1821 detects whether the information processing device 10 is in the open state or the closed state based on the detection results of the first acceleration sensor 161 and the second acceleration sensor 162. Further, when the information processing device 10 is in the open state, the open/close detection unit 1821 detects the open angle θ between the first chassis 101 and the second chassis 102 based on the detection results of the first acceleration sensor 161 and the second acceleration sensor 162. Then, based on the detected open angle θ, the open/close detection unit 1821 detects whether the first chassis 101 and the second chassis 102 are in the bent state (Bent form) or the flat state (Flat form). The posture detection unit 1822 detects the posture (orientation) of the information processing device 10 based on the detection results of the first acceleration sensor 161 and the second acceleration sensor 162. The connection detection unit 1823 detects the connection with the keyboard 30. For example, based on the detection result of the Hall sensor 17, the connection detection unit 1823 detects whether or not the keyboard 30 is mounted on the second display area DA2 to detect the connection with the keyboard 30. The detection processing unit 182 outputs, to the display processing unit 183, the detection results (the state of the information processing device 10) by the open/close detection unit 1821, the posture detection unit 1822, and the connection detection unit 1823.

The detection processing unit 182 further has an operation detection unit 1824 as a functional component to detect an operation to the information processing device 10. The operation detection unit 1824 detects a user operation based on the operation information output from the touch sensor 155 provided on the screen of the display 150. For example, the operation detection unit 1824 acquires operation information based on a user operation on a switching menu screen (see FIG. 5) switchable between display modes to detect a display mode switching operation by the user to switch between display modes based on the acquired operation information. The detection processing unit 182 outputs, to the display processing unit 183, the detected user operation information.

The display processing unit 183 determines a display mode and switches between the display modes based on the open/closed state and the posture (orientation) of the information processing device 10, the user operation, and the like acquired from the detection processing unit 182. Further, based on the app information acquired from the system processing unit 181, the display processing unit 183 controls the display of the windows of running apps (active window and inactive windows) according to the display mode. Specifically, the display processing unit 183 has a display mode determination unit 1831, a display mode switching unit 1832, a thumbnail generation unit 1833, and a display control unit 1834.

The display mode determination unit 1831 performs determination processing to determine the display mode based on the state of the information processing device 10 detected by the detection processing unit 182 or the detection result of the user operation. For example, the display mode determination unit 1831 acquires, from the detection processing unit 182, the detection result of the open/closed state of the information processing device 10, the detection result of whether the information processing device 10 is in the bent state (Bent form) or the flat state (Flat form) in the case of the open state, the detection result of the posture (orientation) of the information processing device 10, and the user operation information. Then, based on the respective detection results and the operation information acquired from the detection processing unit 182, the display mode determination unit 1831 determines the display mode as described with reference to FIG. 4.

The display mode switching unit 1832 performs display mode switching processing to switch between the display modes described with reference to FIG. 4 based on the display mode determined by the display mode determination unit 1831. For example, based on the display mode determined by the display mode determination unit 1831, the display mode switching unit 1832 sets the display mode such as switching between the one-screen mode and the two-screen mode (or inverted two-screen mode), the orientation of each display area, and the display content of each display area.

The thumbnail generation unit 1833 generates thumbnail images corresponding to inactive windows among the windows of running apps. The thumbnail images are displayed in the thumbnail window on the secondary screen (see FIG. 6).

The display control unit 1834 outputs and displays display-data of the window of an app to be displayed in each display area and the thumbnail window according to the display mode set by the display mode switching unit 1832.

For example, when switching from the one-screen mode to the two-screen mode is done by the display mode switching unit 1832, the display control unit 1834 displays, in the first display area DA1 (primary screen), an active window displayed in the display area DA in the one-screen mode. Further, when switching from the one-screen mode to the two-screen mode is done by the display mode switching unit 1832, the display control unit 1834 displays, in the second display area DA2 (secondary screen), the thumbnail window including thumbnail images corresponding to inactive windows other than the active window in the one-screen mode.

However, in the case of the inverted two-screen mode, the display control unit 1834 displays the active window in the second display area DA2 (primary screen) and the thumbnail window in the first display area DA1 (secondary screen).

Further, when any one of the thumbnail images displayed on the secondary screen in the two-screen mode is selected, the display control unit 1834 displays, on the secondary screen, an inactive window corresponding to the selected thumbnail image as an active window. For example, the display control unit 1834 displays, in maximized form, on the secondary screen, the inactive window corresponding to the selected thumbnail image as an active window.

Further, when switching from the two-screen mode to the one-screen mode is done again after switching from the one-screen mode to the two-screen mode by the display mode switching unit 1832, the display control unit 1834 displays the window of each running application in the screen area (display area DA) with the position and size based on the window information stored in the RAM 12. In other words, when switching from the two-screen mode to the one-screen mode is done again after switching from the one-screen mode to the two-screen mode, the display control unit 1834 provides a display by reproducing the position and size of each window based on the position and size in the last one-screen mode.

Further, even when switching from the two-screen mode to the one-screen mode is done in such a state that the display orientation in the screen area is changed according to a change in the orientation of the screen area after switching from the one-screen mode to the two-screen mode by the display mode switching unit 1832, the display control unit 1834 displays, in the screen area (display area DA), the windows of running applications with the positions and sizes based on the window information stored in the RAM 12.

Further, even when switching from the two-screen mode to the one-screen mode is done in such a state that switching processing between the primary screen and the secondary screen is performed after switching from the one-screen mode to the two-screen mode by the display mode switching unit 1832, the display control unit 1834 displays, in the screen area (display area DA), the windows of running applications with the positions and sizes based on the window information stored in the RAM 12.

Note that when window information on an app the window of which is maximized in the one-screen mode is stored in the RAM 12, the display control unit 1834 displays, in the screen area (display area DA), the window of the app in maximized form upon switching from the two-screen mode to the one-screen mode by the display mode switching unit 1832.

Here, the operation of the display control processing executed by the control unit 18 will be described.

FIG. 12 is a flowchart illustrating an example of the display mode switching processing based on the open/close detection according to the present embodiment.

(Step S101) Based on the detection results of the first acceleration sensor 161 and the second acceleration sensor 162, the control unit 18 detects whether the information processing device 10 is in the open state or the closed state. Then, the control unit 18 proceeds to a process in step S103.

(Step S103) Based on the detection result in step S101, the control unit 18 determines whether a change in the information processing device 10 from the closed state to the open state or from the open state to the closed state is detected. When determining that the change from the closed state to the open state is detected, the control unit 18 proceeds to a process in step S105. On the other hand, when determining that the change from the open state to the closed state is detected, the control unit 18 proceeds to a process in step S107.

(Step S105) When determining that the change from the closed state to the open state is detected, the control unit 18 controls the display of the display 150 to be turned on.

(Step S107) When determining that the change from the open state to the closed state is detected, the control unit 18 controls the display of the display 150 to be turned off.

Note that this display control processing is executed repeatedly, for example, at predetermined intervals. In a state where the display is controlled to be on, display mode switching processing to switch between the one-screen mode and the two-screen mode (or the inverted two-screen mode) is executed as described below.

Next, the operation of display mode switching processing executed by the control unit 18 will be described.

Figure 13:
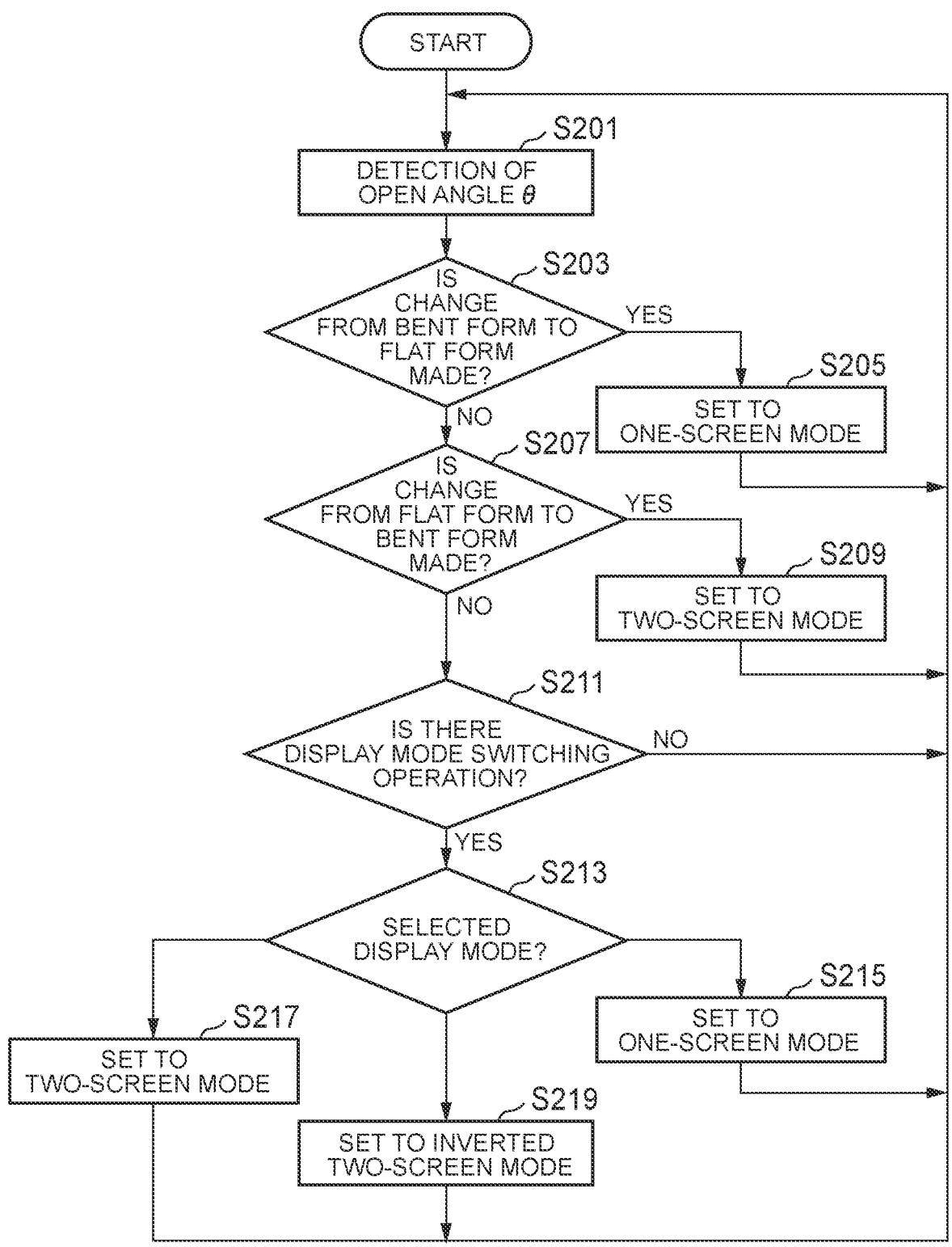
FIG. 13 is a flowchart illustrating an example of display mode switching processing according to the first embodiment.

FIG. 13 is a flowchart illustrating an example of display mode switching processing according to the present embodiment. Here, the display mode switching processing will be described as processing after the control unit 18 detects the change from the closed state to the open state in the display control processing based on the open/close detection illustrated in FIG. 12 to control the display to be turned on.

(Step S201) The control unit 18 detects the open angle θ between the first chassis 101 and the second chassis 102 based on the detection results of the first acceleration sensor 161 and the second acceleration sensor 162. Then, the control unit 18 proceeds to a process in step S203.

(Step S203) Based on the open angle θ detected in step S201, the control unit 18 determines whether or not a change from the bent state (Bent form) to the flat state (Flat form) is made. When determining that the change from the bent state (Bent form) to the flat state (Flat form) is made (YES), the control unit 18 proceeds to a process in step S205. On the other hand, when determining that the change from the bent state (Bent form) to the flat state (Flat form) is not made (NO), the control unit 18 proceeds to a process in step S207.

(Step S205) When determining in step S203 that the change from the bent state (Bent form) to the flat state (Flat form) is made, the control unit 18 sets the screen mode to the one-screen mode. For example, when the setting of the screen mode immediately before the above determination is the two-screen mode, the control unit 18 switches from the two-screen mode to the one-screen mode. On the other hand, when the setting of the screen mode immediately before the above determination is the one-screen mode, the control unit 18 continues the setting of the one-screen mode. Note that the control unit 18 controls the display mode to the display mode (d') or the display mode (e') illustrated in FIG. 4 based on the posture (orientation) of the information processing device 10 detected based on the detection results of the first acceleration sensor 161 and the second acceleration sensor 162. Then, the control unit 18 returns to the process in step S201.

(Step S207) Based on the open angle θ detected in step S201, the control unit 18 determines whether or not the change from the flat state (Flat form) to the bent state (Bent form) is made. When determining that the change from the flat state (Flat form) to the bent state (Bent form) is made (YES), the control unit 18 proceeds to a process in step S209. On the other hand, when determining that the change from the flat state (Flat form) to the bent state (Bent form) is not made (NO), the control unit 18 proceeds to a process in step S211.

(Step S209) When determining in step S207 that the change from the flat state (Flat form) to the bent state (Bent form) is made, the control unit 18 sets the screen mode to the two-screen mode. For example, when the setting of the screen mode immediately before the above determination is the two-screen mode, the control unit 18 continues the setting of the two-screen mode. On the other hand, when the setting of the screen mode immediately before the above determination is the one-screen mode, the control unit 18 switches from the one-screen mode to the two-screen mode. Note that the control unit 18 controls the display mode to the display mode (b) or the display mode (c-1) illustrated in FIG. 4 based on the posture (orientation) of the information processing device 10 detected based on the detection results of the first acceleration sensor 161 and the second acceleration sensor 162. Then, the control unit 18 returns to the processing in step S201.

(Step S211) Based on the operation information output from the touch sensor 155, the control unit 18 determines whether or not there is a display mode switching operation by the user. For example, when there is an operation to select any of the display mode switching icons displayed on the switching menu M1 or the switching menu M2 displayed in FIG. 5, the control unit 18 determines that there is the display mode switching operation. When determining that there is the display mode switching operation (YES), the control unit 18 proceeds to a process in step S213. On the other hand, when determining that there is no display mode switching operation (NO), the control unit 18 returns to the process in step S201.

(Step S213) The control unit 18 determines a display mode of the display mode switching icon selected with the display mode switching operation by the user to control the display mode. For example, when there is an operation to select the display mode switching icon C11 or C21 (see FIG. 5) corresponding to the one-screen mode, the control unit 18 proceeds to a process in step S215. Further, when there is an operation to select the display mode switching icon C12 or C22 (see FIG. 5) corresponding to the two-screen mode, the control unit 18 proceeds to a process in step S217. Further, when there is an operation to select the display mode switching icon C13 or C23 (see FIG. 5) corresponding to the inverted two-screen mode, the control unit 18 proceeds to a process in step S219.

(Step S215) The control unit 18 sets the display mode to that of the one-screen mode. For example, when the setting of the display mode before the display mode switching operation is performed is the two-screen mode, the control unit 18 switches from the two-screen mode to the one-screen mode. On the other hand, when the setting of the display mode before the display mode switching operation is performed is the one-screen mode, the control unit 18 continues the setting of the one-screen mode. Specifically, when there is an operation to select the display mode switching icon C11, the control unit 18 controls the display mode to the display mode (d) in the case of the bent state (Bent form) or to the display mode (d') in the case of the flat state (Flat form). On the other hand, when there is an operation to select the display mode switching icon C21, the control unit 18 controls the display mode to the display mode (e) or the display mode (e'). Then, the control unit 18 returns to the process in step S201.

(Step S217) The control unit 18 sets the display mode to that of the two-screen mode. For example, when the setting of the display mode before the display mode switching operation is performed is the one-screen mode, the control unit 18 switches from the one-screen mode to the two-screen mode. Further, when the setting of the display mode before the display mode switching operation is performed is the inverted two-screen mode, the control unit 18 switches from the inverted two-screen mode to the two-screen mode. Further, when the setting of the display mode before the display mode switching operation is performed is the two-screen mode, the control unit 18 continues the setting of the two-screen mode. Specifically, when there is an operation to select the display mode switching icon C12, the control unit 18 controls the display mode to the display mode (b) in the case of the bent state (Bent form), or in the case of the flat state (Flat form), the control unit 18 controls to provide a display similar to the display mode (b) in the flat state (Flat form). Further, when there is an operation to select the display mode switching icon C22, the control unit 18 controls the display mode to the display mode (c-1) in the case of the bent state (Bent form), or in the case of the flat state (Flat form), the control unit 18 controls to provide a display similar to the display mode (c-1) in the flat state (Flat form). At this time, in both of the display mode (b) and the display mode (c-1), the first display area DA1 is the primary screen and the second display area DA2 is the secondary screen. Then, the control unit 18 returns to the process in step S201.

(Step S219) The control unit 18 sets the display mode to that of the inverted two-screen mode. For example, when the setting of the display mode before the display mode switching operation is performed is the one-screen mode, the control unit 18 switches from the one-screen mode to the inverted two-screen mode. Further, when the setting of the display mode before the display mode switching operation is performed is the two-screen mode, the control unit 18 switches from the two-screen mode to the inverted two-screen mode. Further, when the setting of the display mode before the display mode switching operation is performed is the inverted two-screen mode, the control unit 18 continues the setting of the inverted two-screen mode. Specifically, when there is an operation to select the display mode switching icon C13, the control unit 18 controls the display mode to the display mode (b) in the case of the bent state (Bent form), or in the case of the flat state (Flat form), the control unit 18 controls to provide a display similar to the display mode (b) in the flat state (Flat form). Further, when there is an operation to select the display mode switching icon C23, the control unit 18 controls the display mode to the display mode (c-1) in the case of the bent state (Bent form), or in the case of the flat state (Flat form), the control unit 18 controls to provide a display similar to the display mode (c-1) in the flat state (Flat form). At this time, in both of the display mode (b) and the display mode (c-1), the second display area DA2 is the primary screen and the first display area DA1 is the secondary screen. Then, the control unit 18 returns to the process in step S201.

Note that the control unit 18 may also be configured not to automatically switch the display mode according to the change between the bent state (Bent form) and the flat state (Flat form) that is not bent. In this configuration, the control unit 18 performs the processes in steps S211 to S219 without performing the processes in steps S201 to S209 in the processing example illustrated in FIG. 13. Further, the control unit 18 may be configured to have a control mode to automatically switch the display mode according to the change between the bent state (Bent form) and the flat state (Flat form) that is not bent, and a control mode not to automatically switch the display mode, where these control modes may be selectable by the user.

Further, although the control unit 18 determines in step S211 whether or not there is the display mode switching operation by the user, the operation target (for example, the switching menu M1 or the switching menu M2 illustrated in FIG. 5) operated by the user at this time is pop-up displayed according to the operation (for example, the operation on the icon C1 illustrated in FIG. 5) by the user. On the other hand, when the control unit 18 is configured not to automatically switch the display mode according to the change between the bent state (Bent form) and the flat state (Flat form) that is not bent (or in the control mode), the configuration may also be such that the operation target (for example, the switching menu M1 or the switching menu M2 illustrated in FIG. 5) operated by the user according to the change between the bent state (Bent form) and the flat state (Flat form) that is not bent is displayed. In this case, the control unit 18 displays the operation target (for example, the switching menu M1 or the switching menu M2 illustrated in FIG. 5) operated by the user as the results of the YES determinations in step S203 and step S207 without performing the processes in step S205 and step S209 in the processing example illustrated in FIG. 13, and the control unit 18 proceeds to the process in step S211.

Next, the operation of display control processing in the two-screen mode when switching from the one-screen mode to the two-screen mode is done will be described.

Figure 14:
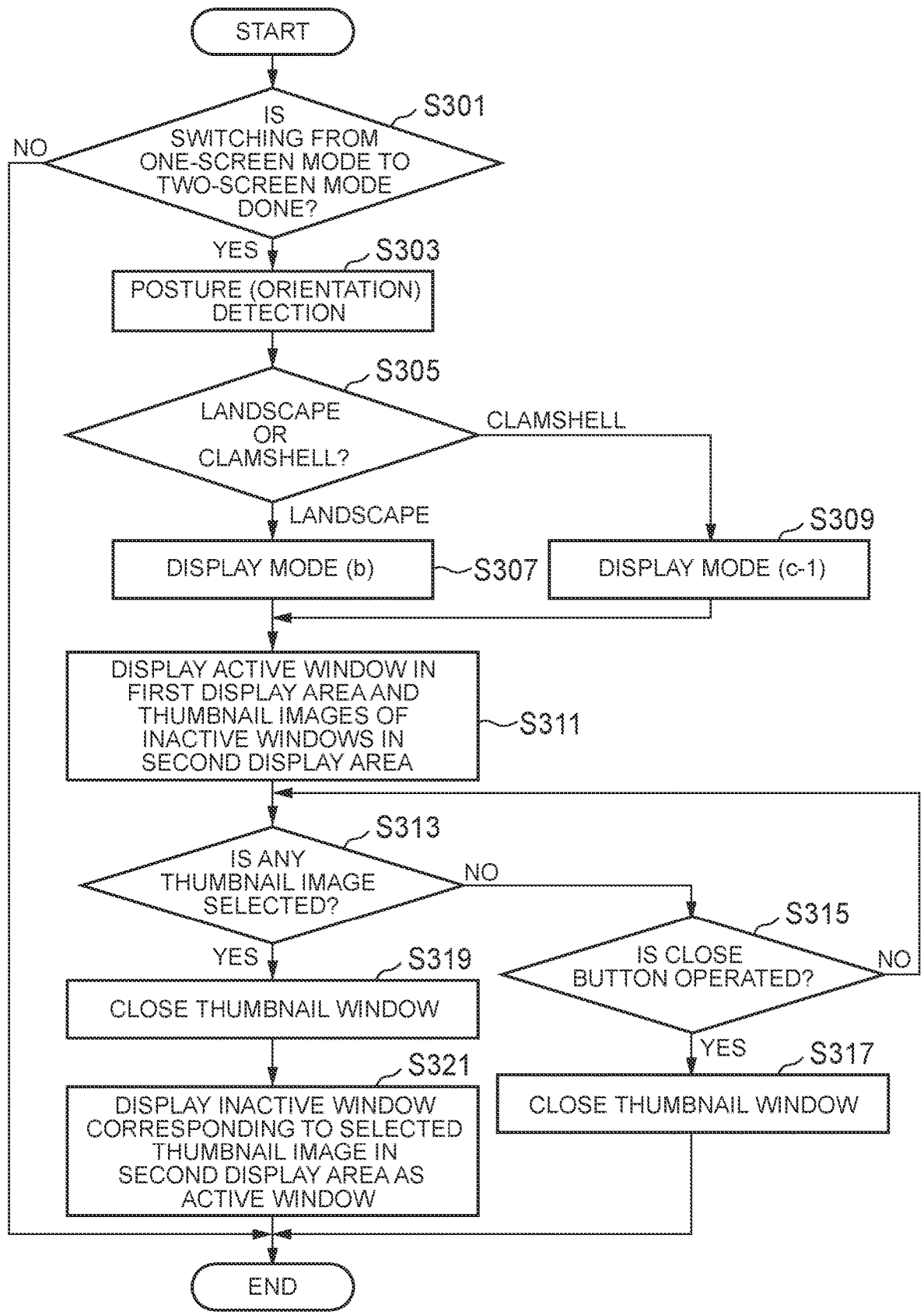
FIG. 14 is a flowchart illustrating an example of display control processing in the two-screen mode according to the first embodiment.

FIG. 14 is a flowchart illustrating an example of the display control processing in the two-screen mode according to the present embodiment.

(Step S301) The control unit 18 determines whether or not switching from the one-screen mode to the two-screen mode is done. When determining that switching from the one-screen mode to the two-screen mode is not done (NO), the control unit 18 continues the one-screen mode, and the processing is ended without displaying the thumbnail window. On the other hand, when determining that switching from the one-screen mode to the two-screen mode is done (YES), the control unit 18 proceeds to a process in step S303.

(Step S303) The control unit 18 detects the posture (orientation) of the information processing device 10 based on the detection results of the first acceleration sensor 161 and the second acceleration sensor 162. Then, the control unit 18 proceeds to a process in step 305.

(Step S305) Based on the posture (orientation) of the information processing device 10 detected in step S303, the control unit 18 determines whether the usage form of the information processing device 10 is "Landscape" or "Clamshell." For example, when determining the "Landscape," the control unit 18 proceeds to a process in step S307. On the other hand, when determining "Clamshell," the control unit 18 proceeds to a process in step S309.

(Step S307) When determining "Landscape," the control unit 18 controls the display mode to the display mode (b) (see FIG. 4). Note that the display mode (b) is an example of the display mode (Fold Landscape) in the bent state (Bent form) in the case of the two-screen mode, but the same also applies to the two-screen mode in the flat state (Flat form). Then, the control unit 18 proceeds to step S311.

(Step S309) When determining "Clamshell," the control unit 18 controls the display mode to the display mode (c-1) (see FIG. 4). Note that the display mode (c-1) is an example of the display mode in the bent state (Bent form) in the case of the two-screen mode, but the same also applies to the two-screen mode in the flat state (Flat form). Then, the control unit 18 proceeds to a process in step S311.

(Step S311) The control unit 18 displays (for example, full-screen displays), in the first display area DA1 (primary screen), an active window among windows of apps running in the one-screen mode immediately before switching to the two-screen mode. Further, the control unit 18 displays, in the second display area DA2 (secondary screen), the thumbnail window containing thumbnail images corresponding to inactive windows among windows of apps running in the one-screen mode immediately before switching to the two-screen mode. At this time, the control unit 18 controls the orientation of each display of the first display area DA1 and the second display area DA2 according to the display orientation of the display mode.

(Step S313) The control unit 18 determines whether any one of the thumbnail images displayed in the second display area DA2 is selected or not. When determining that no thumbnail image is selected (NO), the control unit 18 proceeds to a process in step S315. On the other hand, when determining that any one of the thumbnail images is selected (YES), the control unit 18 proceeds to a process in step S319.

(Step S315) The control unit 18 determines whether the close button displayed on the title bar of the thumbnail window displayed in the second display area DA2 is operated or not. When determining that the close button is operated (YES), the control unit 18 proceeds to a process in step S317. On the other hand, when determining that the close button is not operated (NO), the control unit 18 returns to the process in step S313.

(Step S317) When determining in step S315 that the close button is operated, the control unit 18 closes the thumbnail window and ends the thumbnail window display control processing.

(Step S319) When determining in S313 that any one of the thumbnail images is selected, the control unit 18 closes the thumbnail window, and proceeds to a process in step S321.

(Step S321) The control unit 18 displays an inactive window corresponding to the selected thumbnail image in the second display area DA2 (secondary screen) as an active window in maximized form (full-screen display).

In step S311 of FIG. 14, when switching from the one-screen mode to the inverted two-screen mode is done, the control unit 18 displays (for example, full-screen displays), in second display area DA2 (primary screen), an active window among windows of apps running in the one-screen mode immediately before switching to the inverted two-screen mode, and displays, in the first display area DA1 (secondary screen), the thumbnail window containing thumbnail images corresponding to inactive windows among the windows of apps running in the one-screen mode immediately before switching to the inverted two-screen mode. Further, in the inverted two-screen mode, the control unit 18 displays, in step S321 of FIG. 14, an inactive window corresponding to the selected thumbnail image is displayed in maximized form (full-screen displayed) in the first display area DA1 (secondary screen) as an active window.

Next, the operation of window information holding processing to hold window information upon switching from the one-screen mode to the two-screen mode will be described.

Figure 15:
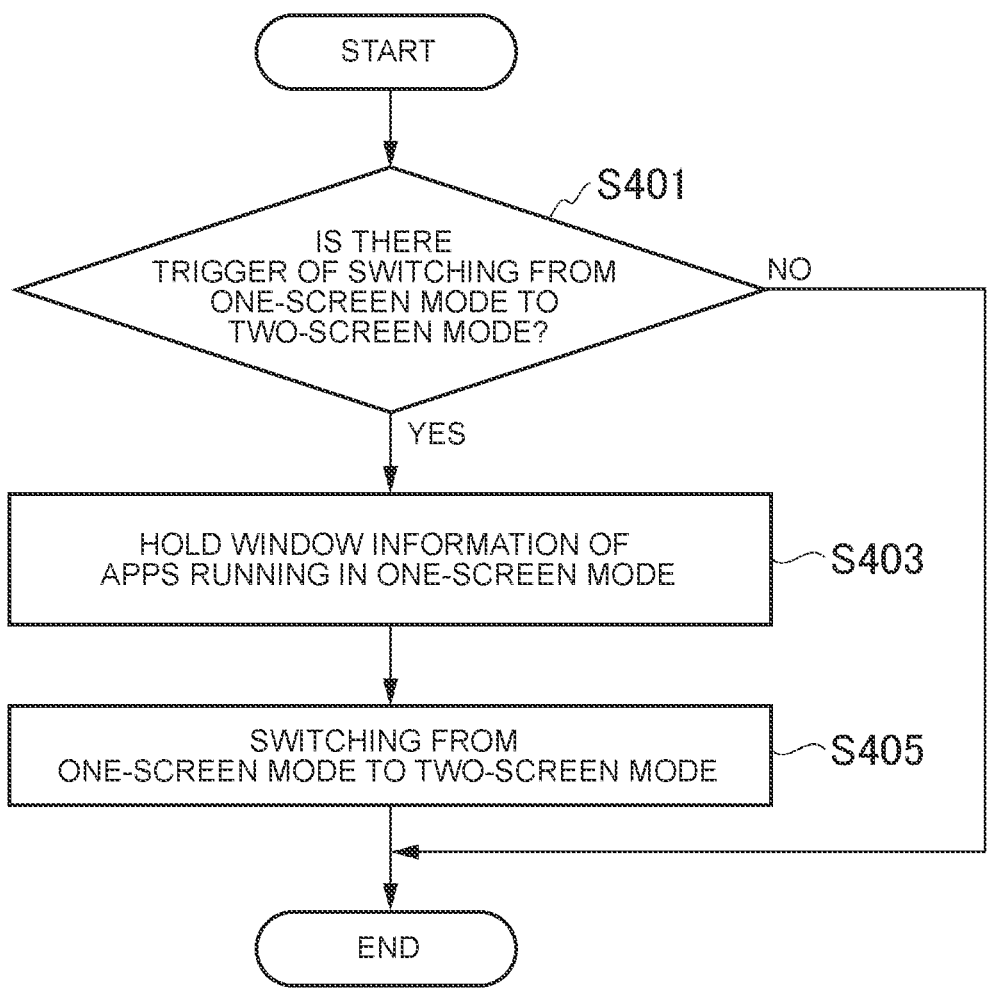
FIG. 15 is a flowchart illustrating an example of window information holding processing according to the first embodiment.

FIG. 15 is a flowchart illustrating an example of the window information holding processing according to the present embodiment.

(Step S401) The control unit 18 determines whether or not there is a trigger of switching from the one-screen mode to the two-screen mode. When determining that there is no trigger of switching from the one-screen mode to the two-screen mode (NO), the control unit 18 ends the processing. On the other hand, when determining that there is the trigger of switching from the one-screen mode to the two-screen mode (YES), the control unit 18 proceeds to a process in step S403.

(Step S403) The control unit 18 stores and holds, in the RAM 12, window information containing the position and size of the window of each app running in the one-screen mode. Then, the control unit 18 proceeds to a process in step S405.

(Step S405) The control unit 18 switches from the one-screen mode to the two-screen mode. After this switching, the display control processing in the two-screen mode illustrated in FIG. 14 is executed.

Next, the operation of display control processing in the one-screen mode upon switching from the two-screen mode to the one-screen mode again will be described.

Figure 16:
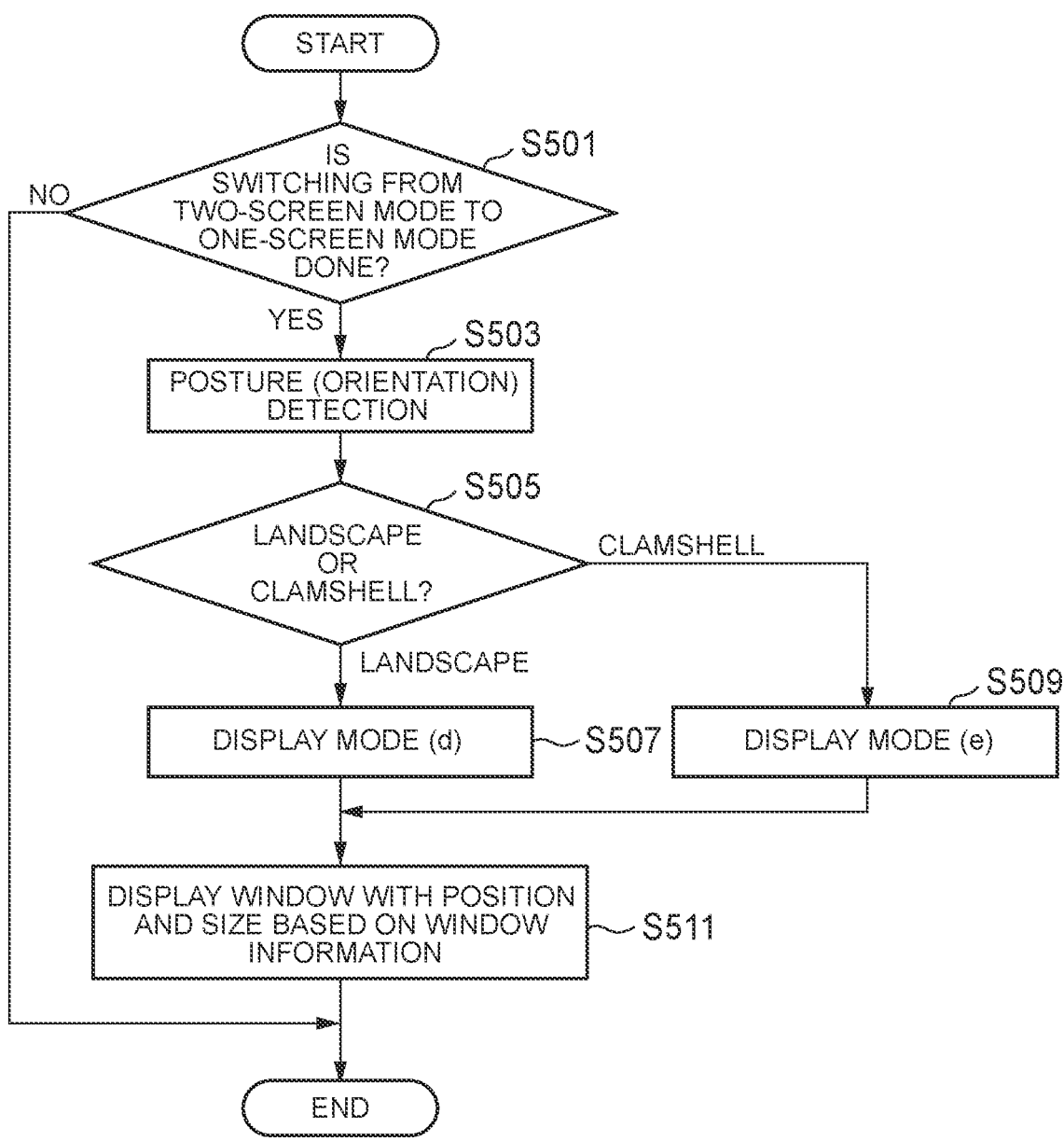
FIG. 16 is a flowchart illustrating an example of display control processing in the one-screen mode according to the first embodiment.

FIG. 16 is a flowchart illustrating an example of display control processing in the one-screen mode according to the present embodiment.

(Step S501) The control unit 18 determines whether or not switching from the two-screen mode to the one-screen mode is done. When determining that switching from the two-screen mode to the one-screen mode is not done (NO), the control unit 18 continues the two-screen mode and ends the processing. On the other hand, when determining that switching from the two-screen mode to the one-screen mode is done (YES), the control unit 18 proceeds to a process in step S503.

(Step S503) The control unit 18 detects the posture (orientation) of the information processing device 10 based on the detection results of the first acceleration sensor 161 and the second acceleration sensor 162. Then, the control unit 18 proceeds to a process in step S505.

(Step S505) Based on the posture (orientation) of the information processing device 10 detected in step S503, the control unit 18 determines whether the usage form of the information processing device 10 is "Landscape" or "Clamshell," For example, when determining "Landscape," the control unit 18 proceeds to a process in step S507. On the other hand, when determining "Clamshell," the control unit 18 proceeds to a process in step S509.

(Step S507) When determining "Landscape," the control unit 18 controls the display mode to the display mode (d) (see FIG. 4). Note that the display mode (d) is an example of the display mode (Fold Landscape) in the one-screen mode in the case of the bent state (Bent form), but the same also applies to the one-screen mode in the flat state (the display mode (d'): Flat Landscape). Then, the control unit 18 proceeds to a process in step S511.

(Step S509) When determining "Clamshell," the control unit 18 controls the display mode to the display mode (e) (see FIG. 4). Note that the display mode (e) is an example of the display mode in the one-screen mode in the case of the bent state (Bent form), but the same also applies to the one-screen mode in the flat state (the display mode (e'): Flat Portrait). Then, the control unit 18 proceeds to the process in step S511.

(Step S511) The control unit 18 refers to the window information stored in the RAM 12 to display, in the display area DA in the one-screen mode, the window of each running app with the position and size based on the window information. In other words, the control unit 18 provides a display by reproducing the position and size of the window in the last one-screen mode.

As described above, the information processing device 10 according to the present embodiment includes the foldable one display 150, the storage unit 13 (an example of a memory) which stores at least a program, and the control unit 18 (an example of a processor such as a CPU, a GPU, or a microcomputer) which executes the program stored in the storage unit 13. The control unit 18 executes the program stored in the storage unit 13 to perform each of the following processing. The control unit 18 performs display mode switching processing to switch between the one-screen mode (an example of a first display mode) in which the display of the screen area of the display 150 is controlled as one display area, and the two-screen mode (an example of a second display mode) in which the screen area of the display 150 is split into two display areas of the first display area DA1 and the second display area DA2 to control the display. Further, the control unit 18 performs information holding processing to hold window information about the position and size of the window of each running app in the screen area in the one-screen mode. Further, the control unit 18 performs display control processing to display the window of each running app in the screen area with the position and size based on the window information held by the above information holding processing when switching from the two-screen mode to the one-screen mode is done again after switching from the one-screen mode to the two-screen mode by the display mode switching processing.

Thus, when returning to the one-screen mode again after switching from the one-screen mode to the two-screen mode, since the information processing device 10 provides a display by reproducing the position and size of the window in the last one-screen mode, it is convenient for the user. Therefore, the information processing device 10 can properly control display upon switching between the one-screen mode and the two-screen mode.

Further, when switching from the one-screen mode to the two-screen mode is done by the display mode switching processing, the control unit 18 displays, in the first display area DA1 (primary screen), an active window in the one-screen mode in the display control processing, and displays, in the second display area DA2 (secondary screen), thumbnail images corresponding to inactive windows other than the active window in the one-screen mode.

Thus, when switching from the one-screen mode to the two-screen mode is done, since the active window of an app used in the one-screen mode is displayed on one screen and the user can use the app continuously while confirming the other running apps on the other screen, the information processing device 10 is convenient for the user. Therefore, the information processing device 10 can properly control display upon switching from the one-screen mode to the two-screen mode.

Further, the information processing device 10 includes the first acceleration sensor 161 and the second acceleration sensor 162 (an example of a sensor) which detect the posture (orientation) of the information processing device 10. Based on the detection results of the first acceleration sensor 161 and the second acceleration sensor 162, the control unit 18 performs orientation detection processing to detect the orientation of each screen area. Then, even when switching from the two-screen mode to the one-screen mode is done in such a state that the display orientation in a screen area is changed according to a change in the orientation of the screen area after switching from the one-screen mode to the two-screen mode by the display mode switching processing, the control unit 18 displays, in the display control processing, the window of each running app in the screen area with the position and size based on the window information held by the information holding processing.

Thus, even when the display mode is changed according to the change in the orientation of the screen area before returning to the one-screen mode after switching from the one-screen mode to the two-screen mode, since the information processing device 10 provides a display by reproducing the position and size of the window in the last one-screen mode when returning to the one-screen mode, it is convenient for the user. Therefore, the information processing device 10 can properly control display upon switching between the one-screen mode and the two-screen mode.

The control unit 18 further performs display area switching processing to switch, by the display mode switching processing, between a mode to control display by setting the first display area DA1 as the primary screen and the second display area DA2 as the secondary screen in the two-screen mode, and a mode (inverted two-screen mode) to control display by setting the second display area DA2 as the primary screen and the first display area DA1 as the secondary screen in the two-screen mode. Then, even when switching from the two-screen mode to the one-screen mode is done in such a state that the above display area switching processing is performed after switching from the one-screen mode to the two-screen mode by the display mode switching processing, the control unit 18 displays, in the display control processing, the window of each running app in the screen area with the position and size based on the window information held by the information holding processing.

Thus, even when the primary screen and the secondary screen are replaced with each other before returning to the one-screen mode after switching from the one-screen mode to the two-screen mode, since the information processing device 10 provides a display by reproducing the position and size of the window in the last one-screen mode when returning to the one-screen mode, it is convenient for the user. Therefore, the information processing device 10 can properly control display upon switching between the one-screen mode and the two-screen mode.

Further, when an app the window of which is maximized in the one-screen mode is held in the window information, the control unit 18 displays the window of the app in the screen area in maximized form by the display control processing when switching from the two-screen mode to the one-screen mode is done by the display mode switching processing.

Thus, when returning to the one-screen mode again after switching from the one-screen mode to the two-screen mode, since the information processing device 10 displays the window maximized in the last one-screen mode in the same maximized form, it is convenient for the user. Therefore, the information processing device 10 can properly control display upon switching between the one-screen mode and the two-screen mode.

Further, in response to switching from the one-screen mode to the two-screen mode by the display mode switching processing, the control unit 18 holds, in the information holding processing, window information on an app running in the one-screen mode before switching.

Thus, since window information on the app running in the one-screen mode before switching is held at the timing of switching from the one-screen mode to the two-screen mode, the information processing device 10 can provide a display by reproducing the position and size of the window of the app in the one-screen mode before switching when returning to the one-screen mode again. Further, since the window information is held at the timing of switching from the one-screen mode to the two-screen mode, the information processing device 10 can just perform the holding processing once to hold the window information with simple processing.

Further, a control method for the information processing device 10 according to the present embodiment includes, by the control unit 18 (the example of the processor such as the CPU, the GPU, or the microcomputer) executing a program stored in the storage unit 13 (the example of the memory): a step of switching between the one-screen mode (the example of the first display mode) in which the display of the screen area of the display 150 is controlled as one display area, and the two-screen mode (the example of the second display mode) in which the screen area of the display 150 is split into two display areas of the first display area DA1 and the second display area DA2 to control the display; a step of holding window information about the position and size, in the screen area, of the window of each app running in the one-screen mode; and a step of displaying the window of the running app in the screen area with the position and size based on the above window information when switching from the two-screen mode to the one-screen mode is done again after switching from the one-screen mode to the two-screen mode.

Thus, since the information processing device 10 provides a display by reproducing the position and size of the window in the last one-screen mode when returning to the one-screen mode again after switching from the one-screen mode to the two-screen mode, it is convenient for the user. Therefore, the information processing device 10 can properly control display upon switching between the one-screen mode and the two-screen mode.

Second Embodiment

Next, an overview of a second embodiment of one or more embodiments of the present invention will be described.

In one or more embodiments mentioned above, the example in which when switching to the one-screen mode is done again after switching from the one-screen mode to the two-screen mode, a display is provided by reproducing the position and size of each window in the last one-screen mode is described, but only an active window may be displayed in maximized form.

FIG. 17 is a diagram illustrating display examples upon switching between the one-screen mode and the two-screen mode according to the present embodiment. Display examples in FIG. 17(A), FIG. 17(B), and FIG. 17(C) are the same as the display examples in FIG. 8(A), FIG. 8 (B), and FIG. 8(C), respectively. In response to switching from the one-screen mode illustrated in FIG. 17(A) to the two-screen mode illustrated in FIG. 17(B), the information processing device 10 holds the position and size of the window of each app running in the one-screen mode before switching. In the two-screen mode illustrated in FIG. 17(B), and in the two-screen mode illustrated in FIG. 17(C) rotated 45 degrees to the left from the state illustrated in FIG. 17(B), the active window AW is displayed in the first display area DA1 (primary screen), and thumbnail windows are displayed in the second display area DA2 (secondary screen).

FIG. 17(D) illustrates a display example when switching from the two-screen mode illustrated in FIG. 17(C) to the one-screen mode is done again. In the display example illustrated in FIG. 8(D), the windows of running apps are displayed by reproducing the positions and sizes of the windows in the one-screen mode (the last one-screen mode) illustrated in FIG. 8(A), but the display example illustrated in FIG. 17(D) is different in that only the active window AW is displayed in maximized form. FIG. 17(D) illustrates that the active window AW is displayed in the display area DA in the maximized form, and inactive windows are reproduced in a layer behind the active window AW with the positions and sizes of the windows in the one-screen mode (the last one-screen mode) illustrated in FIG. 17(A). Note that since the inactive windows are placed in the layer behind the active window AW, the inactive windows are not displayed in the display area DA in such a state that the active window AW is displayed, which are not visible to the user. When any one of the inactive windows is selected after switching to the one-screen mode (for example, when the icon of an app corresponding to the inactive window is selected on the task bar or the like), the selected inactive window is displayed as an active window with the position and size of the window in the one-screen mode (the last one-screen mode) illustrated in FIG. 17(A).

As described above, in the information processing device 10 according to the present embodiment, when switching from the two-screen mode to the one-screen mode is done by the display mode switching processing, the control unit 18 displays, in the screen area, an active window among windows of running apps in maximized form, and when the inactive windows other than the active window are displayed in the screen area, the inactive windows are displayed with the positions and sizes based on the window information held by the information holding processing.

Thus, since the active window using by the user is always displayed in maximized form when returning from the two-screen mode to the one-screen mode, the information processing device 10 is convenient for the user. Therefore, the information processing device 10 can properly control display upon switching between the one-screen mode and the two-screen mode.

Third Embodiment

Next, an overview of a third embodiment of one or more embodiments of the present invention will be described.

In one or more embodiments, the example of holding window information at the timing of switching from the one-screen mode to the two-screen mode is described, but in this embodiment, another method of holding window information will be described.

In response to launching a program (hereinafter called a "display mode switching program") to execute display mode switching processing, the running app information generating unit 1811 generates window information indicative of the positions and sizes of applications running upon launching the program. The display mode switching program is a program executed on the OS to perform display mode switching processing including UI processing to switch between display modes, for example, as illustrated in FIG. 5, which is launched in response to booting of the OS.

Then, the running app information generating unit 1811 stores and holds the generated window information in the RAM 12. Further, when an app is newly launched after that, the running app information generating unit 1811 adds and stores window information of the launched app to and in the RAM 12. When the position or size of the window of an app held as the window information is changed, the running app information generating unit 1811 updates the window information of the changed app based on the changed position or size. When a running app is closed, the running app information generating unit 1811 erases the window information of the closed app from the RAM 12.

Note that when a running app is closed, the running app information generating unit 1811 may also keep the window information of the closed app without erasing it from the RAM 12. Keeping the window information of the closed app enables the app to be displayed with the position or size before the app is closed in the one-screen mode upon switching to the one-screen mode, for example, after the app once closed in the one-screen mode is launched in the two-screen mode. Further, in a case where the OS stores the last position or size of an app (before being closed), when the app once closed in the one-screen mode is launched in the two-screen mode, it is also possible to display the app with the position or size once stored by the OS in OS processing and resize the app to fit the two-screen mode after storing the position or size. Similarly, upon switching to the one-screen mode, it is possible to display the app using the stored position or size.

Figure 18:
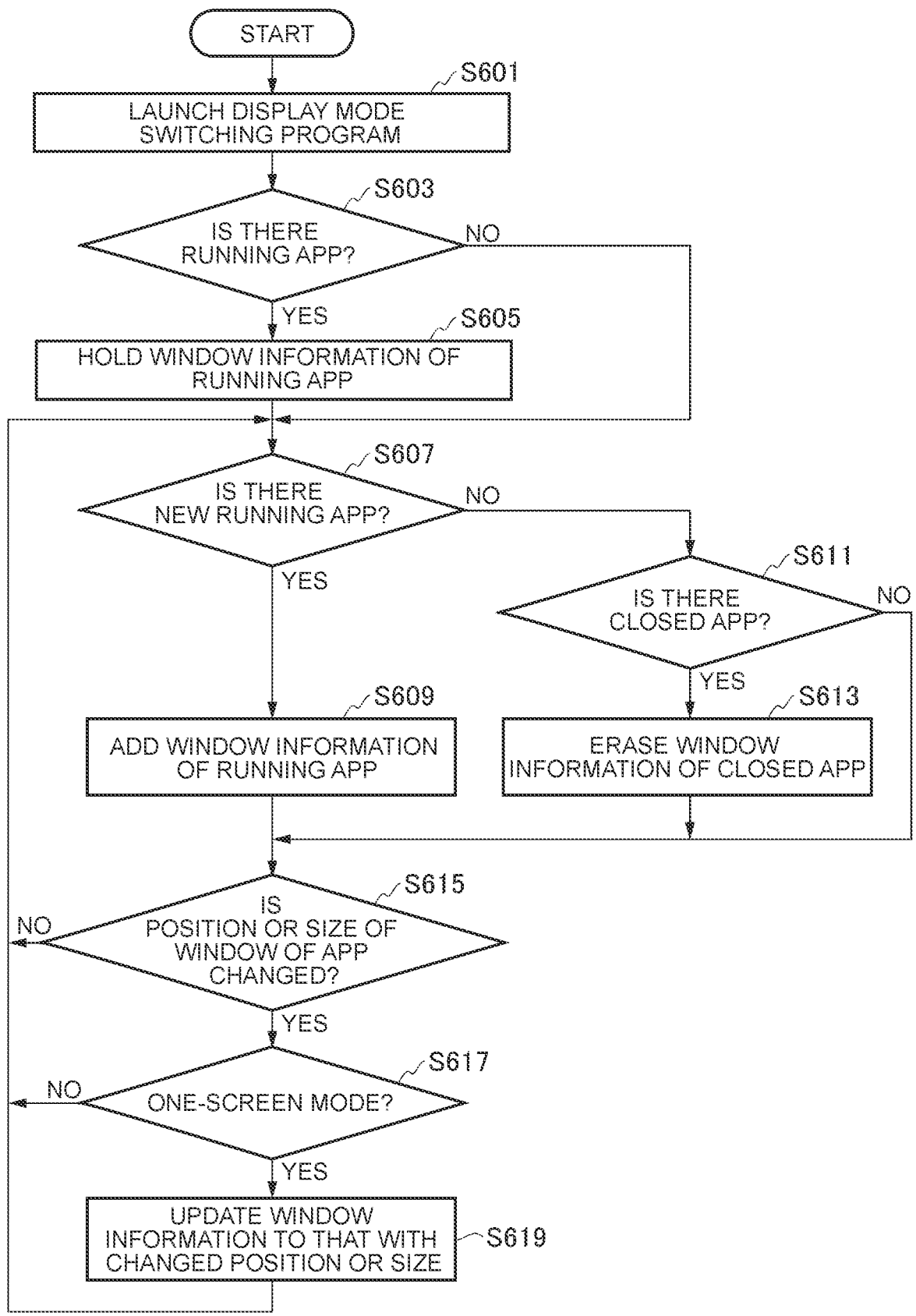
FIG. 18 is a flowchart illustrating an example of window information holding processing according to a third embodiment of one or more embodiments.

FIG. 18 is a flowchart illustrating an example of window information holding processing according to the present embodiment.

(Step S601) Upon launching the display mode switching program, the control unit 18 proceeds to a process in step S603.

(Step S603) The control unit 18 determines whether or not there is a running app. When determining that there is a running app (YES), the control unit 18 proceeds to a process in step S605. On the other hand, when determining that there is no running app (NO), the control unit 18 proceeds to a process in step S607.

(Step S605) The control unit 18 stores and holds window information containing the position and size of the window of the running app in the RAM 12. Then, the control unit 18 proceeds to a process in step S607.

(Step S607) The control unit 18 determines whether or not there is a new running app. When determining that there is a new running app (YES), the control unit 18 proceeds to a process in step S609. On the other hand, when determining that there is no new running app (NO), the control unit 18 proceeds to a process in step S611.

(Step S609) The control unit 18 adds, to the RAM 12, window information containing the position and size of the window of the new running app. Then, the control unit 18 proceeds to a process in step S615.

(Step S611) The control unit 18 determines whether or not there is a closed app. When determining that there is a closed app (YES), the control unit 18 proceeds to a process in step S613. On the other hand, when determining that there is no closed app (NO), the control unit 18 proceeds to a process in step S615.

(Step S613) The control unit 18 erases the window information of the closed app from the RAM 12. Then, control unit 18 proceeds to the process in step S615.

(Step S615) The control unit 18 determines whether or not the position or size of the window of any running app is changed. When determining that the position or size of the window of any running app is not changed (NO), the control unit 18 returns to the process in step S607. On the other hand, when determining that the position or size of the window of any running app is changed (YES), the control unit 18 proceeds to a process in step S617.

(Step S617) The control unit 18 determines whether or not the screen mode is the one-screen mode. When determining that the screen mode is not the one-screen mode (NO), the control unit 18 returns to the process in step S607. On the other hand, when determining that the screen mode is the one-screen mode (YES), the control unit 18 proceeds to a process in step S619.

(Step S619) The control unit 18 updates the window information of the app with the window position or size changed to window information with the position or size after changed. Then, the control unit 18 returns to the process in step S607.

As described above, in the information processing device 10 according to the present embodiment, in response to launching the display mode switching program (an example of a program to perform at least display mode switching processing), the control unit 18 holds window information of apps running upon launching the display mode switching program. Further, when a new app is launched in the one-screen mode after launching the display mode switching program, the control unit 18 adds and holds window information of the launched app.

In other words, the information processing device 10 holds window information of an app(s) already launched when the display mode switching program is launched, and then adds and holds window information each time an app is additionally launched. Therefore, window information of apps already running at the timing of switching from the one-screen mode to the two-screen mode is held. Therefore, when returning to the one-screen mode again, the information processing device 10 can provide a display by reproducing the position and size of the window of each app in the one-screen mode before switching without taking processing time to hold window information at the timing of switching from the one-screen mode to the two-screen mode. Further, the information processing device 10 can also hold window information of an app pre-launched by the OS (Pre-launched application) by holding window information of apps already launched when the display mode switching program is launched.

Further, in the information holding processing, when the position or size of the window of an app in the screen area held as window information is changed in the one-screen mode, the control unit 18 updates the window information of the app based on the changed position or size.

Thus, even when the position or size of the app the window information of which is held is changed before switching from the one-screen mode to the two-screen mode, the information processing device 10 can always hold the window information of the app in association with the position and size of the current window.

Further, in the information holding processing, when a running app is closed in the one-screen mode, the control unit 18 erases the window information of the closed app.

Thus, the information processing device 10 can hold only the window information of currently running apps.

While the embodiments of this invention have been described in detail with reference to the accompanying drawings, the specific configurations are not limited to those described above, and various design changes and the like can be made without departing from the scope of this invention. For example, the processing configurations described in the above respective embodiments may be combined with each other arbitrarily.

Further, in the above-described embodiments, the example in which the first display area DA1 is set to the primary screen and the second display area DA2 is set to the secondary screen by default in the two-screen mode, and the second display area DA2 is set to the primary screen and the first display area DA1 is set to the secondary screen in the inverted two-screen mode is described, but the correspondence between the primary screen and the secondary screen may be reversed. In other words, the correspondence may also be such that the second display area DA2 is set to the primary screen and the first display area DA1 is set to the secondary screen by default in the two-screen mode, and the first display area DA1 is set to the primary screen and the second display area DA2 is set to the secondary screen in the inverted two-screen mode.

Further, in the above-described embodiments, the examples of the one-screen mode, in which the screen area of the display 150 is controlled as the one display area DA, and the two-screen mode, in which the screen area of the display 150 is split into two display areas of the first display area DA1 and the second display area DA2 to control respective displays, are described. However, when the screen area of the display 150 is split, it is not limited to splitting the screen area into only two display areas, and it may be split into three or more display areas. For example, even in a case of a three-screen mode in which the screen area of the display 150 is split into three display areas to control respective displays, the display orientation of each of the three display areas may also be changed according to the rotation of the display 150 without replacing pieces of display data to be displayed respectively in the three display areas.

Further, in the above-described embodiments, the example in which the foldable one display 150 is used in the one-screen mode and the two-screen mode is described, but two displays may also be used. In other words, the processing in each of the embodiments described above can also be applied to switching between the one-screen mode to control display as a screen area (display area) obtained by combining respective screen areas (display areas) of the two displays into one, and the two-screen mode to control displays in the respective screen areas (display areas) of the two displays individually.

Further, in the above-described embodiments, the examples of touch operations on two or more touch panel displays each of which is composed integrally of an input unit (touch sensor) and a display unit are described, but the operations are not limited to the touch operations, and the operations may also be click operations using a mouse, operations by gesture, and the like.

Note that the above-described control unit 18 has a computer system therein. Then, a program for implementing the function of each component included in the control unit 18 described above may be recorded on a computer-readable recording medium in such a manner that the program recorded on this recording medium is read into the computer system and executed to perform processing in each component included in the control unit 18 described above. Here, the fact that "the program recorded on the recording medium is read into the computer system and executed" includes installing the program on the computer system. It is assumed that the "computer system" here includes the OS and hardware such as a peripheral device and the like. Further, the "computer system" may also include two or more computers connected through any of networks including the Internet, WAN, LAN, and a communication line such as a dedicated line. Further, the "computer-readable recording medium" means a storage medium such as a flexible disk, a magneto-optical disk, a ROM, a portable medium like a CD-ROM, or a hard disk incorporated in the computer system. The recording medium with the program stored thereon may be a non-transitory recording medium such as the CD-ROM.

A recording medium internally or externally provided to be accessible from a delivery server for delivering the program is included as the recording medium. Note that the program may be divided into plural pieces, downloaded at different timings, respectively, and then united in each component included in the control unit 18, or delivery servers for delivering respective divided pieces of the program may be different from one another. Further, the "computer-readable recording medium" includes a medium on which the program is held for a given length of time, such as a volatile memory (RAM) inside a computer system as a server or a client when the program is transmitted through the network. The above-mentioned program may also be to implement some of the functions described above. Further, the program may be a so-called differential file (differential program) capable of implementing the above-described functions in combination with a program(s) already recorded in the computer system.

Further, some or all of the functions of the control unit 18 in the above-described embodiments may be realized as an integrated circuit such as LSI (Large Scale Integration). Each function may be a processor implemented individually, or part or whole thereof may be integrated as a processor. Further, the method of circuit integration is not limited to LSI, and it may be realized by a dedicated circuit or a general-purpose processor. Further, if integrated circuit technology replacing the LSI appears with the progress of semiconductor technology, an integrated circuit according to the technology may be used.

DESCRIPTION OF SYMBOLS

10 information processing device
101 first chassis
102 second chassis
103 hinge mechanism
11 communication unit
12 RAM
13 storage unit
14 speaker
15 display unit
16 camera
150 display
155 touch sensor
161 first acceleration sensor
162 second acceleration sensor
17 Hall sensor
18 control unit
181 system processing unit
1811 running app information generating unit
182 detection processing unit
1821 open/close detection unit
1822 posture detection unit
1823 connection detection unit
1824 operation detection unit
183 display processing unit
1831 display mode determination unit
1832 display mode switching unit
1833 thumbnail generation unit
1834 display control unit

What is claimed is:

1. An information processing device comprising:
a foldable one display;
a memory which stores at least a program; and
a processor which executes the program stored in the memory,
wherein, by executing the program stored in the memory, the processor performs:
display mode switching processing to switch between a first display mode in which display of a screen area of the display is controlled as one display area, and a second display mode in which the screen area of the display is split into two display areas of a first display area and a second display area to control the display;
information holding processing to hold window information about position and size, in the screen area, of a window of each application running in the first display mode; and
display control processing to display the window of the running application in the screen area with the position and size based on the window information held by the information holding processing when switching from the second display mode to the first display mode is done again after switching from the first display mode to the second display mode by the display mode switching processing,
when switching from the second display mode to the first display mode is done by the display mode switching processing, the processor displays, in an entire screen area of the first display, an active window among windows of running applications in the screen area by the display control processing, and when inactive windows other than the active window are displayed in the screen area, the processor displays the inactive windows with positions and sizes based on the window information held by the information holding processing.

2. The information processing device according to claim 1, wherein
when switching from the first display mode to the second display mode is done by the display mode switching processing, the processor displays, in the display control processing, an active window in the first display mode in the first display area, and displays, in the second display area, thumbnail images corresponding to inactive windows other than the active window in the first display mode.

3. The information processing device according to claim 1, further comprising
a sensor which detects orientation of the information processing device, wherein
by executing the program stored in the memory, the processor further performs orientation detection processing to detect orientation of the screen area based on the detection result of the sensor, and
even when switching from the second display mode to the first screen mode is done in such a state that display orientation in the screen area is changed according to a change in the orientation of the screen area after switching from the first display mode to the second display mode by the display mode switching processing, the processor displays, in the display control processing, the window of each running application in the screen area with the position and size based on the window information held by the information holding processing.

4. The information processing device according to claim 1, wherein
by the display mode switching processing, the processor further performs display area switching processing to switch between:
a first sub-mode of the second display mode to control display by setting the first display area as a primary screen and the second display area as a secondary screen; and
a second sub-mode of the second display mode to control display by setting the second display area as the primary screen and the first display area as the secondary screen, and
even when switching from the second display mode to the first display mode is done in such a state that the display area switching processing is performed after switching from the first display mode to the second display mode by the display mode switching processing, the processor displays, in the display control processing, the window of each running application in the screen area with the position and size based on the window information held by the information holding processing.

5. The information processing device according to claim 1, wherein
in a case where the window information of an application the window of which is the entire screen area of the first display mode is held, when switching from the second display mode to the first display mode is done by the display mode switching processing, the processor displays, in the entire screen area of the first display, the window of the application in the screen area by the display control processing.

6. The information processing device according to claim 1, wherein
in response to switching from the first display mode to the second display mode by the display mode switching processing, the processor holds, in the information holding processing, the window information of applications running in the first display mode before switching.

7. The information processing device according to claim 6, wherein
when a running application is closed in the first display mode, the processor erases the window information of the closed application in the information holding processing.

8. The information processing device according to claim 1, wherein
in response to launching the program to perform at least the display mode switching processing, the processor holds, in the information holding processing, the window information of applications running upon launching the program, and when a new application is launched in the first display mode after launching the program, the processor adds and holds the window information of the launched application.

9. The information processing device according to claim 8, wherein
when the position or size of a window of an application in the screen area held as the window information is changed in the first display mode, the processor updates, in the information holding processing, the window information of the application based on the position or size after changed.

10. A control method for an information processing device including: a foldable one display; a memory which stores at least a program; and a processor which executes the program stored in the memory, the control method comprising, by the processor executing the program stored in the memory:
switching between a first display mode in which display of a screen area of the display is controlled as one display area, and a second display mode in which the screen area is split into two display areas of a first display area and a second display area to control the display;
holding, in the memory, window information about position and size, in the screen area, of a window of each application running in the first display mode; and
displaying the window of the running application in the screen area with the position and size based on the window information when switching from the second display mode to the first display mode is done again after switching from the first display mode to the second display mode,
when switching from the second display mode to the first display mode is done by the display mode switching processing, the processor displays, in an entire screen area of the first display, an active window among windows of running applications in the screen area by the display control processing, and when inactive windows other than the active window are displayed in the screen area, the processor displays the inactive windows with positions and sizes based on the window information held by the information holding processing.

* * * * *